United States Patent
Kamiya et al.

(10) Patent No.: US 9,136,979 B2
(45) Date of Patent: Sep. 15, 2015

(54) CARRIER WAVE REPRODUCTION DEVICE AND CARRIER WAVE REPRODUCTION METHOD

(71) Applicant: NEC CORPORATION, Tokyo (JP)

(72) Inventors: Norifumi Kamiya, Tokyo (JP); Eisaku Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/396,089

(22) PCT Filed: Apr. 23, 2013

(86) PCT No.: PCT/JP2013/061881
§ 371 (c)(1),
(2) Date: Oct. 22, 2014

(87) PCT Pub. No.: WO2013/161801
PCT Pub. Date: Oct. 31, 2013

(65) Prior Publication Data
US 2015/0085960 A1    Mar. 26, 2015

(30) Foreign Application Priority Data
Apr. 24, 2012  (JP) ................................. 2012-099167

(51) Int. Cl.
*H04L 1/00* (2006.01)
*H04L 27/38* (2006.01)
(Continued)

(52) U.S. Cl.
CPC ............ *H04L 1/0036* (2013.01); *H04L 1/0045* (2013.01); *H04L 27/0014* (2013.01);
(Continued)

(58) Field of Classification Search
CPC ..... H04L 1/0036; H04L 1/0047; H04L 27/22; H04L 27/38; H04L 2027/0067; H04L 1/0045; H04L 27/3836; H04L 27/0014; H04L 2027/0024
USPC .................................. 375/260, 316, 340, 346
See application file for complete search history.

(56) References Cited

U.S. PATENT DOCUMENTS

| | | | |
|---|---|---|---|
| 5,694,388 A | 12/1997 | Sawahashi et al. | |
| 6,618,352 B1 * | 9/2003 | Shirakata et al. | 370/203 |

(Continued)

FOREIGN PATENT DOCUMENTS

| | | |
|---|---|---|
| JP | 8-191285 A | 7/1996 |
| JP | 2000-101666 A | 4/2000 |

(Continued)

OTHER PUBLICATIONS

Takashi Asahara et al., "A Study on Pilot Symbol Assisted Coherent Demodulation Method for Rician Fading Channels", Technical Report of IEICE, Feb. 1998, pp. 77-84, vol. 97, No. 547.
(Continued)

*Primary Examiner* — Leon Flores
(74) *Attorney, Agent, or Firm* — Sughrue Mion, PLLC

(57) ABSTRACT

The present invention provides a carrier wave reproduction device in which bit-error characteristics are improved without decreasing transmission capacity. The carrier wave reproduction device is equipped with an interpolation filter that estimates a phase error for a received symbol on the basis of a pilot symbol included in the received symbol, a first phase rotation machine that rotates a phase of the received symbol in response to the phase error estimated by the interpolation filter and then outputs the rotated symbol as a first output symbol, a phase error compensating unit that compensates for the phase error remaining in the first output symbol and then outputs the result of the compensation as a second output symbol, a QAM symbol demapping unit that calculates both a first bit string corresponding to the first output symbol and a second bit string corresponding to the second output signal, and an error correction decoder which performs error correction on the bit error in the first bit string and outputs the result. The phase error compensating unit refers to the first bit string after error correction has been performed thereon and then compensates for the phase error remaining in the first output symbol.

12 Claims, 15 Drawing Sheets

(51) Int. Cl.
*H04L 27/00* (2006.01)
*H04L 27/22* (2006.01)

(52) U.S. Cl.
CPC ............ *H04L27/22* (2013.01); *H04L 27/3836* (2013.01); *H04L 2027/0024* (2013.01); *H04L 2027/0067* (2013.01)

(56) References Cited

U.S. PATENT DOCUMENTS

| | | | |
|---|---|---|---|
| 2009/0125793 A1* | 5/2009 | Kishigami et al. | 714/794 |
| 2009/0175367 A1* | 7/2009 | Kishigami et al. | 375/260 |
| 2010/0301931 A1* | 12/2010 | Hahm et al. | 329/345 |

FOREIGN PATENT DOCUMENTS

| | | | |
|---|---|---|---|
| JP | 2003-531523 A | 10/2003 | |
| JP | 2009-239545 A | 10/2009 | |
| JP | 2011-101177 A | 5/2011 | |
| WO | 96/00471 A1 | 1/1996 | |
| WO | 2011/068119 A1 | 6/2011 | |

OTHER PUBLICATIONS

Volker Simon et al., "Phase Noise Estimation via Adapted Interpolation", IEEE Global Telecommunications Conference, Nov. 25, 2001, pp. 3297-3301.

Arnaldo Spalvieri et al., "Pilot-Added Carrier Recovery in the Presence of Phase Noise", IEEE Transactions on Communications, Jul. 7, 2011, pp. 1966-1974, vol. 59, No. 7.

International Search Report for PCT/JP2013/061881 dated Jun. 25, 2013.

* cited by examiner

CARRIER WAVE REPRODUCTION DEVICE AND CARRIER WAVE REPRODUCTION METHOD

DESCRIPTION ABOUT RELATED APPLICATIONS

This application is a National Stage Entry of International Application No. PCT/JP2013/061881 filed Apr. 23, 2013, claiming priority based on Japanese Patent Application No. 2012-099167 (filed on Apr. 24, 2012), the disclosure of which is hereby incorporated by reference in its entirety.

TECHNICAL FIELD

The present invention relates to a carrier wave reproduction device and a carrier wave reproduction method and in particular, relates to a carrier wave reproduction device which can be suitably applied to a demodulation device for multi-level transmission including error correction and a carrier wave reproduction method.

BACKGROUND ART

In digital communication, as a modulation and demodulation method for efficiently transmitting and receiving data, the quadrature amplitude modulation (QAM) method in which both phase information and amplitude information is used for data discrimination is known. At present, with the increase of the demand of a large capacity wireless communication system, it is required to increase the modulation multi-level number.

However, when the modulation multi-level number is increased, a problem in which a transmission error rate due to noise increases and noise immunity decreases occurs. In particular, a phase noise generated by a reference oscillator (Local Oscillator; LO) provided in a transmission device or a reception device increases indeterminacy of phase information and deteriorates a bit error rate (BER) characteristic. Accordingly, for example, in order to perform highly reliable data communication by using a multi-level QAM method in which 256 or more signal points are used, a phase error produced by the phase noise needs to be compensated for at high accuracy. Further, at the same time, immunity to error due to other factors such as thermal noise and the like needs to be improved.

FIG. 14 is a block diagram showing a configuration of a demodulation device according to a related technology in a reception device of a digital wireless device system. Referring to FIG. 14, the demodulation device includes a reference oscillator 121, a detector 122, an analog/digital (A/D) converter 123, a carrier wave reproduction phase lock loop (Phase Lock Loop; PLL) in which a phase rotator 124, a phase error detector 125, a loop filter 126, and a numerical control oscillator 127 are connected in a loop, a QAM symbol demapping unit 128 which converts a received symbol into a bit string, and an error correction decoder 129.

The reference oscillator 121 outputs a reference signal having a predetermined fixed frequency. The detector 122 performs quadrature detection of an input signal by using the reference signal and generates an Ich (In-phase channel) baseband signal and a Qch (Quadrate-phase Channel) baseband signal. The generated baseband signal is converted into a digital signal through the A/D converter 123.

The phase rotator 124 corrects the phase error by rotating the phase of the received symbol that corresponds to the Ich digitalized baseband signal and the Qch digitalized baseband signal according to output information of the numerical control oscillator 127. The output signal of the phase rotator 124 is inputted to the phase error detector 125. The phase error detector 125 detects the phase error which remains in the received symbol and outputs it to the loop filter 126. The loop filter 126 removes an unnecessary high frequency component included in the phase error and outputs it to the numerical control oscillator 127. The numerical control oscillator 127 generates phase error information which specifies a phase rotation amount in the phase rotator 124 from the output of the loop filter 126 and outputs it.

As described above, by the operation of the carrier wave reproduction PLL in which the phase rotator 124, the phase error detector 125, the loop filter 126, and the numerical control oscillators 127 are connected in a loop, a stable phase locked state can be realized. Whereby, the phase error can be compensated for.

The received symbol to which the phase noise correction is performed by the phase rotator 124 is inputted to the phase error detector 125 and also, inputted to the QAM symbol demapping unit 128. The QAM symbol demapping unit 128 calculates a received bit string corresponding to the received symbol from the received symbol and the error correction decoder 129 performs an error correction process and outputs the received bit string. When a soft decision decoder which receives likelihood information indicating a certainty of each received bit and performs the correction process is used for the error correction decoder 129, the QAM symbol demapping unit 128 outputs the bit string in which the likelihood information is reflected. For example, the QAM symbol demapping unit 128 which outputs the bit string in which the likelihood information is reflected is described in patent literature 1.

As described above, the demodulation device according to the related technology compensates for the phase error by the carrier wave reproduction PLL and realizes improvement in error immunity by the error correction process performed in a later stage. However, there is a case in which when the accuracy of the phase error detector 125 decreases by the phase noise included in the baseband signal outputted by the detector 122, a thermal noise, and the like, the satisfactory BER performance cannot be obtained. In this case, a technology in which the phase error compensation accuracy is improved by adaptively adjusting a bandwidth of the loop filter 126 in the carrier wave reproduction PLL is disclosed in patent literature 2, patent literature 3, and patent literature 4. However, there is a case in which even when these technologies are used, a sufficient effect cannot be obtained.

As a method other than the method using the carrier wave reproduction PLL, there is a method in which a known signal (a pilot signal) is inserted in the transmission signal and the phase error is compensated for by using this known signal. FIG. 15 is a block diagram showing a configuration of the demodulation device using this method. Referring to FIG. 15, the demodulation device includes a reference oscillator 131, a detector 132, an A/D converter 133, a QAM symbol demapping unit 137, and an error correction decoder 138 like the demodulation device shown in FIG. 14. Further, the demodulation device includes an interpolation filter 135 which estimates the phase error between the received pilot symbols from the received pilot symbol corresponding to the pilot signal, a delay circuit 134 which delays a signal by the number of symbols corresponding to a delay incurred by the interpolation process, and a phase rotator 136 which corrects the estimated phase error.

The demodulation device shown in FIG. 15 performs quadrature detection of the input signal in the detector 132 by using the reference signal with the fixed frequency outputted by the reference oscillator 131 and generates the Ich (In-phase channel) baseband signal and the Qch (Quadrate-phase Channel) baseband signal like the demodulation device shown in FIG. 14. The generated baseband signal is converted into the digital signal through the A/D converter 133.

The received symbol that corresponds to the Ich digitalized baseband signal and the Qch digitalized baseband signal is inputted to the delay circuit 134. Here, only when the received symbol is the pilot symbol corresponding to the known pilot signal, the received symbol is also inputted to the interpolation filter 135. The interpolation filter 135 estimates the phase error in the received symbol between the pilot symbols from a plurality of the pilot symbols by the interpolation process. The phase rotator 136 rotates the phase of the received symbol based on the phase error information outputted by the interpolation filter and corrects the phase error in the received symbol.

The received symbol to which the phase error is compensated for by the interpolation filter 135 is inputted to the QAM symbol demapping unit 137 like the demodulation method performed by the demodulation device shown in FIG. 14 and converted into the (soft decision) received bit string. After this process, the error correction process is performed in the error correction decoder 138 and it is outputted as output data.

For example, the demodulation method using the interpolation filter which uses the pilot symbol is described in non-patent literature 1 and non-patent literature 2.

CITATION LIST

Patent Literature

Patent literature 1: International Publication 2011/068119
Patent literature 2: Japanese Patent Application Laid-Open No. 2000-101666
Patent literature 3: Japanese Unexamined Patent Application Laid-Open No. 2003-531523
Patent literature 4: Japanese Patent Application Laid-Open No. 2011-101177

Non Patent Literature

Non Patent literature 1: Arnaldo Spalvieri, Luca Barletta, "Pilot-Aided Carrier Recovery in the Presence of Phase Noise", IEEE Transactions on Communications, Jul. 1, 2011, pp. 1966 to 1974
Non Patent literature 2: Volker Simon, Andreas Senst, Michael Speth, Heinrich Meyr, "Phase Noise Estimation via Adapted Interpolation", IEEE Global Telecommunications Conference, Nov. 25, 2001, pp. 3297 to 3301

SUMMARY OF INVENTION

Technical Problem

The following analysis is performed by the inventor of the present invention.

The demand of a large capacity wireless communication system is greatly increasing and it is required to increase the modulation multi-level number. However, when the phase noise of a LO signal which has a large influence on a transmission characteristic is reduced, the cost greatly increase. Further, in order to improve the performance of the error correction function, the demodulator is required to stably operate even when a carrier to noise ratio (C/N) is low. The effect of the phase noise compensation by the carrier wave reproduction PLL according to the related technology is limited with respect to this problem. For example, when the level of the phase noise included in the baseband signal outputted by the detector is great compared with the signal multi-level number of the QAM method, the satisfactory BER performance cannot be obtained and it is difficult to perform a large capacity and high-quality data communication.

On the other hand, a demodulation method in which the inserted pilot signal is used as a clue and the phase error is compensated for by passing through the interpolation filter is basically used for a modulation method such as QPSK or the like in which the number of signal points is small. Therefore, it is difficult to obtain the characteristic required for a multi-level modulation method based on only this demodulation method. Further, a problem in which when an insertion ratio of the pilot signal increases, the transmission capacity decreases and the effect of a multi-level modulation decreases occurs.

Accordingly, it is desired to improve a bit error rate characteristic without decreasing the transmission capacity.

An object of the present invention is to provide a carrier wave reproduction device and a carrier wave reproduction method which contribute to the demand.

Solution to Problem

A carrier wave reproduction device according to a first aspect of the present invention includes
an interpolation filter which estimates a phase error of a received symbol based on a pilot symbol included in the received symbol,
a first phase rotator which rotates the phase of the received symbol according to the phase error estimated by the interpolation filter and outputs the symbol as a first output symbol,
a phase error compensation unit which compensates for the phase error which remains in the first output symbol and outputs the symbol as a second output symbol,
a QAM symbol demapping unit which calculates a first bit string corresponding to the first output symbol and calculates a second bit string corresponding to the second output symbol, and
an error correction decoder which performs error correction of a bit error in the first bit string and outputs the first bit string after error correction. Wherein the phase error compensation unit compensates for the phase error which remains in the first output symbol by referring to the first bit string after error correction.

A carrier wave reproduction method according to a second aspect of the present invention includes
a step of estimating a phase error of a received symbol based on a pilot symbol included in the received symbol,
a step of rotating the phase of the received symbol according to the estimated phase error and outputting the symbol as a first output symbol,
a step of calculating a first bit string corresponding to the first output symbol,
a step of performing error correction of a bit error in the first bit string,
a step of compensating for the phase error which remains in the first output symbol by referring to the first bit string after error correction and outputting the symbol as a second output symbol,
a step of calculating a second bit string corresponding to the second output symbol, and a step of performing error correction of a bit error in the second bit string.

Advantageous Effects of Invention

By using the carrier wave reproduction device and the carrier wave reproduction method according to the present invention, a bit error rate characteristic can be improved without decreasing a transmission capacity.

DESCRIPTION OF EMBODIMENTS

Figure 1:
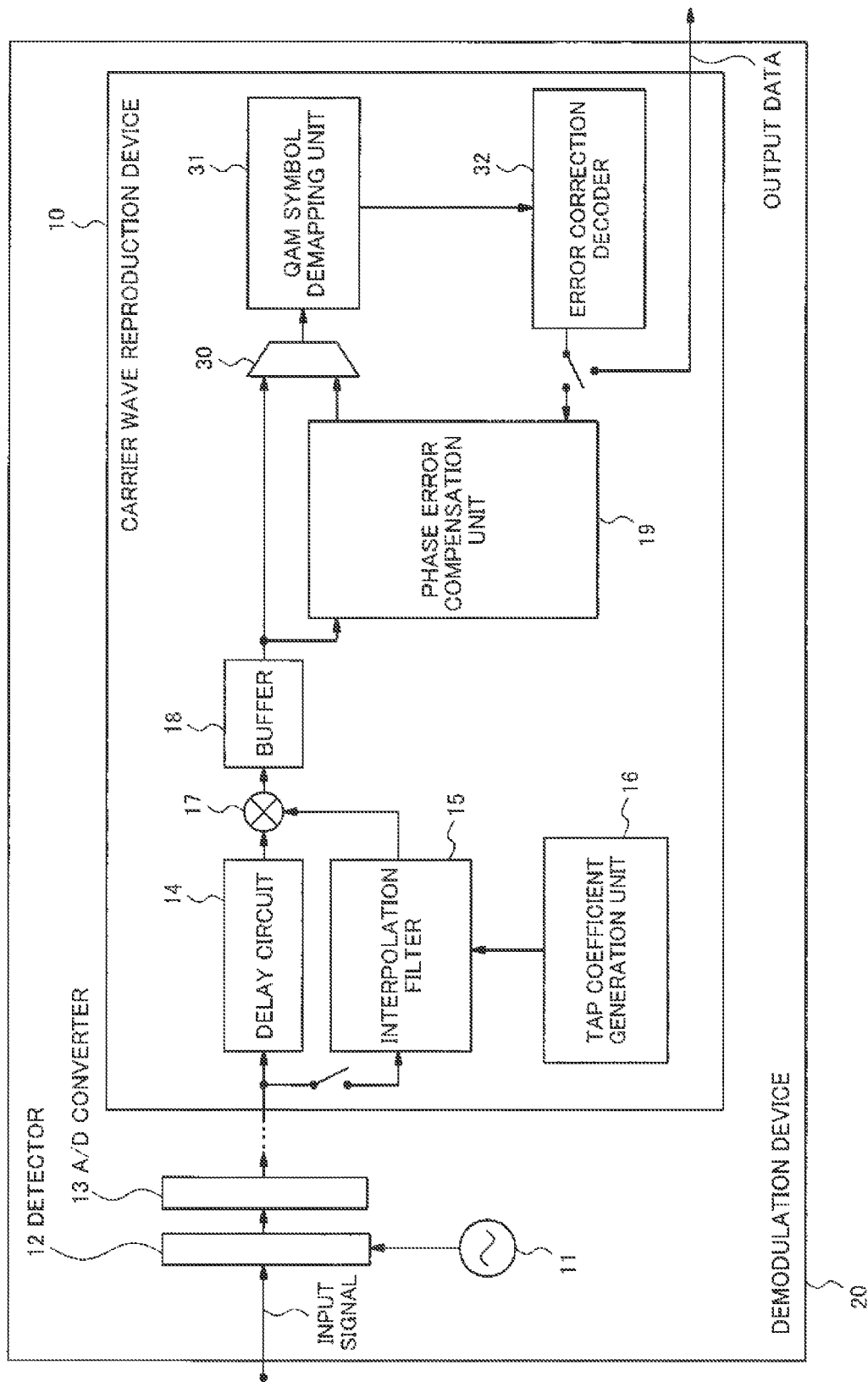
FIG. 1 is a block diagram showing a configuration of a carrier wave reproduction device according to a first exemplary embodiment as an example.

First, an outline of an exemplary embodiment will be described. Further, a drawing reference code described in figures is shown as an example in order to help the understanding and it is not intend to limit the present invention to the embodiment shown in the drawing.

FIG. 1 is a block diagram showing a configuration of a demodulation device equipped with a carrier wave reproduction device according to one exemplary embodiment as an example.

Referring to FIG. 1, a carrier wave reproduction device (10) includes an interpolation filter (15) which estimates a phase error of a received symbol based on a pilot symbol included in the received symbol, a first phase rotator (17) which rotates the phase of the received symbol according to the phase error estimated by the interpolation filter (15) and outputs the symbol as a first output symbol, a phase error compensation unit (19) which compensates for the phase error which remains in the first output symbol and outputs the symbol as a second output symbol, a QAM symbol demapping unit (31) which calculates a first bit string corresponding to the first output symbol and calculates a second bit string corresponding to the second output symbol, and an error correction decoder (32) which performs error correction of a bit error in the first bit string and outputs the bit string. The phase error compensation unit (19) compensates for the phase error which remains in the first output symbol by referring to the first bit string after error correction.

Figure 7:
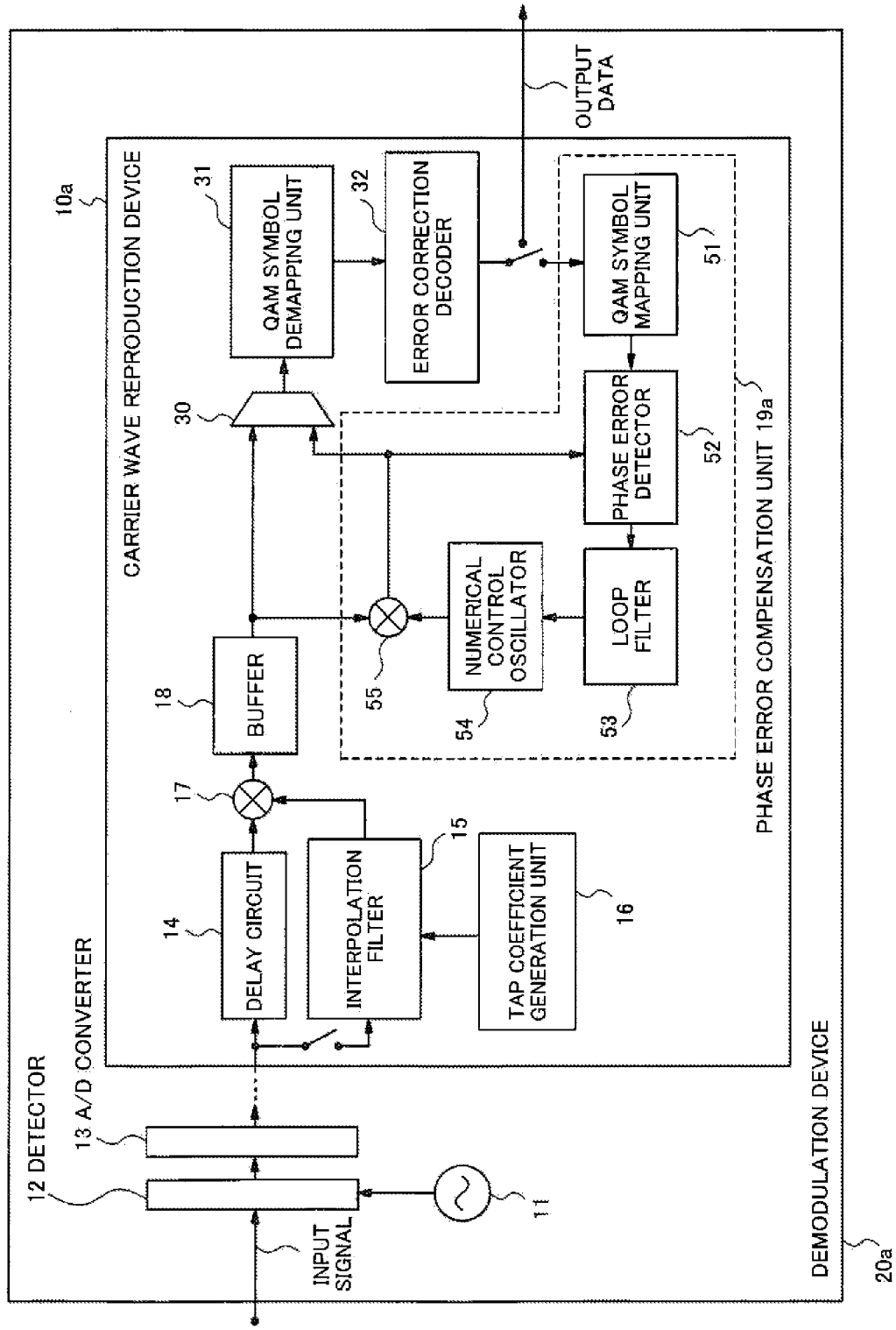
FIG. 7 is a block diagram showing a configuration of a carrier wave reproduction device according to a second exemplary embodiment as an example.
Figure 11:
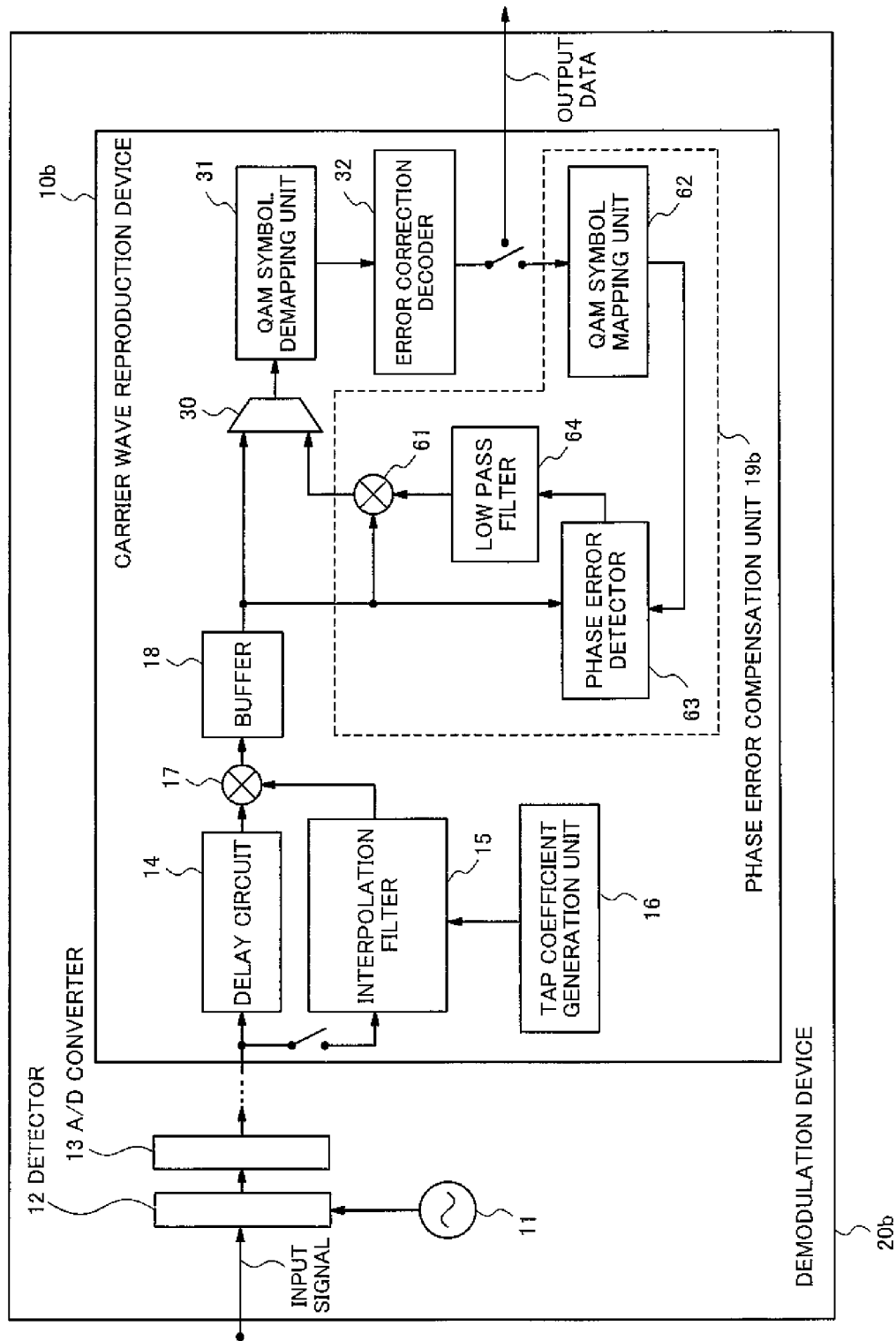
FIG. 11 is a block diagram showing a configuration of a carrier wave reproduction device according to a third exemplary embodiment as an example.

FIG. 7 and FIG. 11 are block diagrams showing a detailed configuration of the phase error compensation unit (19) shown in FIG. 1 as an example. Referring to FIG. 7 and FIG. 11, a carrier wave reproduction device (a carrier wave reproduction device 10a shown in FIG. 7, a carrier wave reproduction device 10b shown in FIG. 11) includes a buffer (18) which temporarily holds the first output symbol outputted from the first phase rotator (17) and a phase error compensation unit (a phase error compensation unit 19a shown in FIG. 7, a phase error compensation unit 19b shown in FIG. 11) may include a second phase rotator (a second phase rotator 55 shown in FIG. 7, a second phase rotator 61 shown in FIG. 11) which rotates the phase of the first output symbol outputted from the buffer (18) and generates the second output symbol.

Referring to FIG. 7 and FIG. 11, the phase error compensation unit (the phase error compensation unit 19a shown in FIG. 7, the phase error compensation unit 19b shown in FIG. 11) may include a QAM symbol mapping unit (a QAM symbol mapping unit 51 shown in FIG. 7, a QAM symbol mapping unit 62 shown in FIG. 11) which generates the symbol according to the bit string after error correction as a third output symbol.

Referring to FIG. 7 and FIG. 11, the phase error compensation unit (the phase error compensation unit 19a shown in FIG. 7, the phase error compensation unit 19b shown in FIG. 11) may compensate for the phase error which remains in the first output symbol by detecting a phase difference between at least either the first output symbol or the second output symbol and the third output symbol.

Referring to FIG. 7, the phase error compensation unit (19a) includes a phase error detector (52) which detects the phase difference between the second output symbol and the third output symbol and a numerical control oscillator (54) which calculates a phase rotation amount based on the phase difference from which a high frequency component included in the phase difference is removed and the second phase rotator (55) may generate the second output symbol by rotating the phase of the first output symbol outputted from the buffer (18) according to the phase rotation amount.

Referring to FIG. 7, the phase error compensation unit (19a) may include a loop filter (53) which removes the high frequency component included in the phase difference and output the phase difference after removal of the high frequency component to the numerical control oscillator (54).

Referring to FIG. 11, the phase error compensation unit (19b) may include a phase error detector (63) which detects the phase difference between the first output symbol and the third output symbol and a low pass filter (64) which performs the averaging of the phase difference and calculates the phase rotation amount. The second phase rotator (61) may rotate the phase of the first output symbol outputted from the buffer (18) according to the phase rotation amount and generate the second output symbol.

As described above, in the carrier wave reproduction device (10) according to one exemplary embodiment, the interpolation filter (15) corrects the phase error in the received symbol from the received pilot symbol by the interpolation process and the phase error compensation unit (19) further corrects the phase error which remains in the received symbol after correction. Here, the phase error compensation unit (19) performs error correction of a result of a first stage correction performed by the interpolation filter (15) through the demapping process and estimates the phase error with high accuracy by using the result as the reference data. By repeatedly performing a series of the processes: a demapping process, an error correction process, and a phase error compensation process, the carrier wave reproduction device which estimates the phase error with high accuracy without increasing the pilot symbol and has the excellent bit error rate characteristic can be realized.

The carrier wave reproduction device according to one exemplary embodiment has an excellent bit error rate characteristic even under severe noise environment which is created by a phase noise, a thermal noise, and the like and can provide large capacity and high-quality data communication service. By using such carrier wave reproduction device, even when the phase noise level is great compared with the modulation multi-level number, the bit error rate characteristic of the reception device can be improved without remarkably reducing the transmission capacity.

Further, in the present invention, the following embodiment can be realized.

Embodiment 1

A carrier wave reproduction device is the same as the carrier wave reproduction device according to the first aspect mentioned above.

Embodiment 2

A carrier wave reproduction device may include a buffer which temporarily holds the first output symbol outputted from the first phase rotator and the phase error compensation unit may include a second phase rotator which rotates the phase of the first output symbol outputted from the buffer and generates the second output symbol.

Embodiment 3

The phase error compensation unit may include a QAM symbol mapping unit which generates the symbol corresponding to the bit string after error correction as a third output symbol.

Embodiment 4

The phase error compensation unit may compensate for the phase error which remains in the first output symbol by detecting a phase difference between at least either the first output symbol or the second output symbol and the third output symbol.

Embodiment 5

The phase error compensation unit may include a phase error detector which detects the phase difference between the second output symbol and the third output symbol and a numerical control oscillator which calculates a phase rotation amount based on the phase difference in which the high frequency component included in the phase difference is removed and the second phase rotator may generate the second output symbol by rotating the phase of the first output symbol outputted from the buffer according to the phase rotation amount.

Embodiment 6

The phase error compensation unit may include a loop filter which removes the high frequency component included in the phase difference and outputs the phase difference after removal of the high frequency component to the numerical control oscillator.

Embodiment 7

The phase error compensation unit may include a phase error detector which detects the phase difference between the first output symbol and the third output symbol and a low pass filter which performs the averaging of the phase difference and calculates the phase rotation amount. The second phase rotator may rotate the phase of the first output symbol outputted from the buffer according to the phase rotation amount and generate the second output symbol.

Embodiment 8

The interpolation filter may be a finite impulse response type filter including a plurality of registers which hold the pilot symbol, a plurality of multipliers whose number is equal to the number of registers, and a plurality of adders whose number is equal to the number of registers.

Embodiment 9

The interpolation filter may determine an initial value of a tap coefficient and a step width used when the tap coefficient is updated according to a phase noise level and a carrier to noise ratio and may update the tap coefficient the number of times that is equal to the number of intervals between the pilot symbols included in the received symbol.

Embodiment 10

A demodulation device based on the quasi-synchronous detection method may include the above-mentioned carrier wave reproduction device.

Embodiment 11

A carrier wave reproduction method is the same as the carrier wave reproduction method according to the second aspect mentioned above.

Embodiment 12

A carrier wave reproduction method may repeat
a step for compensating for a phase error which remains in a n-th output symbol by referring to a n-th bit string after error correction (n is a natural number) and outputting the symbol as a (n+1)th output symbol,
a step for calculating a (n+1)th bit string corresponding to the (n+1)th output symbol, and
a step for performing error correction of a bit error in the (n+1)th bit string until n is equal to a predetermined number while incrementing n or all the errors are corrected in the error correction.

Embodiment 13

A carrier wave reproduction device based on a quasi-synchronous detection demodulation method which demodulates the data signal including a known pilot signal may include an interpolation filter which estimates a phase error to all the received symbols including the received pilot symbol from the received pilot symbol, a first phase rotator which corrects the phase error by rotating the phase of the received symbol by the phase error amount estimated by the interpolation filter, a phase error compensation unit which compensates for a residual phase error which remains in the output symbol of the first phase rotator, an error correction decoder which generates the data inputted to the phase error compensation unit as a reference, and a QAM symbol demapping unit which converts the output of the phase error compensation unit and the output symbol of the first phase rotator into the input bit string inputted to the error correction decoder. The phase error compensation may be performed two times: the phase error compensation performed by the interpolation filter and the phase error compensation performed by the phase error compensation unit.

Embodiment 14

A carrier wave reproduction device may include a buffer which temporarily holds the output of the first phase rotator.

Embodiment 15

The phase error compensation unit may include a second phase rotator which rotates the phase of the output symbol of the buffer, a QAM symbol mapping unit which generates a replica of a transmission symbol sequence corresponding to the output data from the output data of the error correction decoder, a phase error detector which detects a phase difference between the output symbol of the second phase rotator and the replica, a loop filter which removes the high frequency component included in the output of the phase error detector, and a numerical control oscillator which calculates a phase rotation amount from the output of the loop filter and may perform a second-stage phase error compensation by the second phase rotator that is connected with the phase error detector, the loop filter, and the numerical control oscillator so as to form a loop.

Embodiment 16

The phase error compensation unit may include a second phase rotator which rotates the phase of the output symbol of the buffer, a QAM symbol mapping unit which generates a replica of the transmission symbol sequence corresponding to the output data from the output data of the error correction decoder, a phase error detector which detects a phase difference between the output symbol of the buffer and the replica, and a low pass filter which performs the averaging of the output value of the phase error detector and may perform the second-stage phase error compensation by rotating the phase of the output symbol of the buffer by the second phase rotator by using the output of the low pass filter.

Embodiment 17

The interpolation filter may be a finite impulse response (FIR) type filter including registers which receive only the pilot symbol and hold a fixed number of the received pilot symbols, multipliers whose number is equal to the number of the registers, and cumulative addition devices whose number is equal to the number of the registers and the tap coefficient of the interpolation filter may be updated the number of times that is equal to the number of intervals between the received pilot symbols.

Embodiment 18

A carrier wave reproduction method for a quasi-synchronous detection demodulation system which demodulates the data signal including a known pilot signal may include an interpolation process step in which an interpolation process which estimates a phase error to all the received symbols including a received pilot symbol by interpolation from the received pilot symbol is performed, a first-time phase error compensation step in which the estimated phase error is corrected, a demapping process step in which demapping of the received symbol to which the phase error is compensated for is performed to obtain a bit string, an error correction process step in which the error correction is performed to the bit string obtained by demapping, and a step in which when the number of phase error compensation times is smaller than the number of times set in advance, a second-time phase error compensation and the successive-time phase error compensation are performed.

In a second-time and successive-time phase error compensation processes, the data to which the error correction process is performed may be used as a reference and the second-time and successive-time phase error compensation process step, the demapping process step, and the error correction process step may be repeatedly performed until the number of phase error compensation times is equal to the number of times set in advance or all the errors are corrected by the error correction process.

Embodiment 19

The second-time and successive-time phase error compensation process step may include a step in which a replica of the transmission symbol sequence is generated by mapping the data to which the error correction process is performed to a QAM symbol, a step in which the phase error is detected by using the replica as a reference, a step in which the high frequency component included in the phase error is removed, a step in which phase rotation information is generated by converting the phase error information from which the high frequency component is removed, and a step in which the phase error compensation is performed by the phase rotation information and the phase error may be detected by feeding the received symbol to which the phase error compensation is performed back to the step which detects the phase error.

Embodiment 20

The second-time and successive-time phase error compensation process step may include a step in which a transmission symbol replica is generated by mapping the data to which the error correction process is performed to the QAM symbol, a step in which the phase error is detected by using the transmission symbol replica as a reference, and a step in which the averaging of the detected phase error is performed by passing through a low pass filter and a phase rotation signal is generated and the phase error compensation may be performed based on the phase rotation signal.

Embodiment 21

The interpolation process step may include
a step in which an initial value of a tap coefficient is set,
a step in which a product-sum operation process is performed, and
two kinds of tap coefficient update steps in which the tap coefficient is updated by the cumulative addition and
the product-sum operation process step and the tap coefficient update step may be repeated the number of times that is equal to the number of intervals between the received pilot symbols.

Next, the exemplary embodiment will be described in detail with reference to the drawing. In the following exemplary embodiment, a modulation method in which phase information is used for data identification is used. In the following exemplary embodiment, the QAM modulation method is taken as an example. However, when another modulation method which uses the phase information for data identification is used, this exemplary embodiment can be applied to the another modulation method. In this exemplary embodiment, as a detection method of a demodulation method, the quasi-synchronous detection method in which the detection is performed by using a periodic signal with a fixed frequency generated by a demodulation device itself and the phase error is removed after the detection is used. When this method is used, it is not necessary to generate a signal which completely synchronizes with the carrier wave.

Exemplary Embodiment 1

A carrier wave reproduction device according to a first exemplary embodiment will be described with reference to the drawing. FIG. 1 is a block diagram showing a configuration of a demodulation device 20 equipped with the carrier wave reproduction device 10 according to the exemplary embodiment as an example.

The demodulation device 20 is a device which demodulates a data signal including a known pilot signal. Referring to FIG. 1, the demodulation device 20 includes a reference oscillator 11, a detector 12, an A/D converter 13, and the carrier wave reproduction device 10. The carrier wave reproduction device 10 includes the delay circuit 14, the interpolation filter 15, a tap coefficient generation unit 16 that relates to the interpolation filter 15, the phase rotator 17, the phase error compensation unit 19, the QAM symbol demapping unit 31, and the error correction decoder 32.

The reference oscillator 11 outputs a reference signal with a fixed frequency to the detector 12. The detector 12 performs quadrature detection of an IF (Intermediate Frequency) input signal and generates an Ich baseband signal and a Qch baseband signal. The generated baseband signal is converted into the digital signal by passing through the A/D converter 13.

When the number of signal points of the QAM method that is a modulation and demodulation means is 2m (m is a positive integer), the transmitted bit string is divided into sections, each of which is composed of m bits at a transmission side and each of m bits is mapped to one signal point among 2m signal points. The mapped signal point can be expressed by a complex value and this is called a transmission symbol. The Ich digitalized baseband signal and the Qch digitalized baseband signal that are obtained by the A/D converter 13 are the received symbols corresponding to the transmission symbols. The received symbol can be expressed by a complex value whose real part corresponds to the Ich baseband signal and whose imaginary part corresponds to the Qch baseband signal. Hereinafter, this complex value is called a "received symbol" and this is inputted to the carrier wave reproduction device 10. On the other hand, the output of the carrier wave reproduction device 10 is composed of a bit string corresponding to the transmission symbol estimated from the received symbol.

The delay circuit 14 receives the received symbol, delays it by a fixed time interval according to a processing time required by the interpolation filter 15 described later, and outputs it to the phase rotator 17.

The interpolation filter 15 receives only the known pilot symbol inserted at the transmission side in the received symbol composed of the Ich digitalized baseband signal and the Qch digitalized baseband signal, calculates an estimation value of the phase error included in the received symbol from a plurality of pilot symbols with respect to the received symbol between the respective pilot symbols, and outputs it to the phase rotator 17.

The tap coefficient generation unit 16 generates the data used for the process for estimating the phase error in the interpolation filter 15 from statistical information about a phase noise and a thermal noise, and supplies it to the interpolation filter 15.

The phase rotator 17 receives the output of the delay circuit 14 and the output of the interpolation filter 15, rotates the phase of the received symbol that is the output of the delay circuit 14 based on the output data of the interpolation filter 15, and outputs the received symbol to the buffer 18.

The phase error compensation unit 19 receives the output symbol of the phase rotator 17 via the buffer 18, estimates the phase error which remains in the output symbol of the phase rotator 17, and performs a correction. In order to estimate the phase error which remains in the output symbol, the phase error compensation unit 19 uses output data of the error correction decoder 32.

The QAM symbol demapping unit 31 receives the output symbol of the buffer 18 and the output symbol of the phase error compensation unit 19 via the selector 30, calculates the bit string corresponding to the output symbol from the output symbol of the selector 30, and outputs the bit string to the error correction decoder 32 described later.

Further, in this exemplary embodiment, as an example, a case in which a soft decision decoder which receives likelihood information to each transmission bit and performs the correction process is used for the error correction decoder 32 will be explained. In this case, the QAM symbol demapping unit 31 outputs the bit string in which the likelihood information indicating a certainty of the received bit is reflected. As an example, a unit described in patent literature 1 can be used for the QAM symbol demapping unit 31.

The error correction decoder 32 receives the output data of the QAM symbol demapping unit 31, estimates the bit error included in the output symbol of the buffer 18 or the phase error compensation unit 19, and performs correction.

Figure 2:
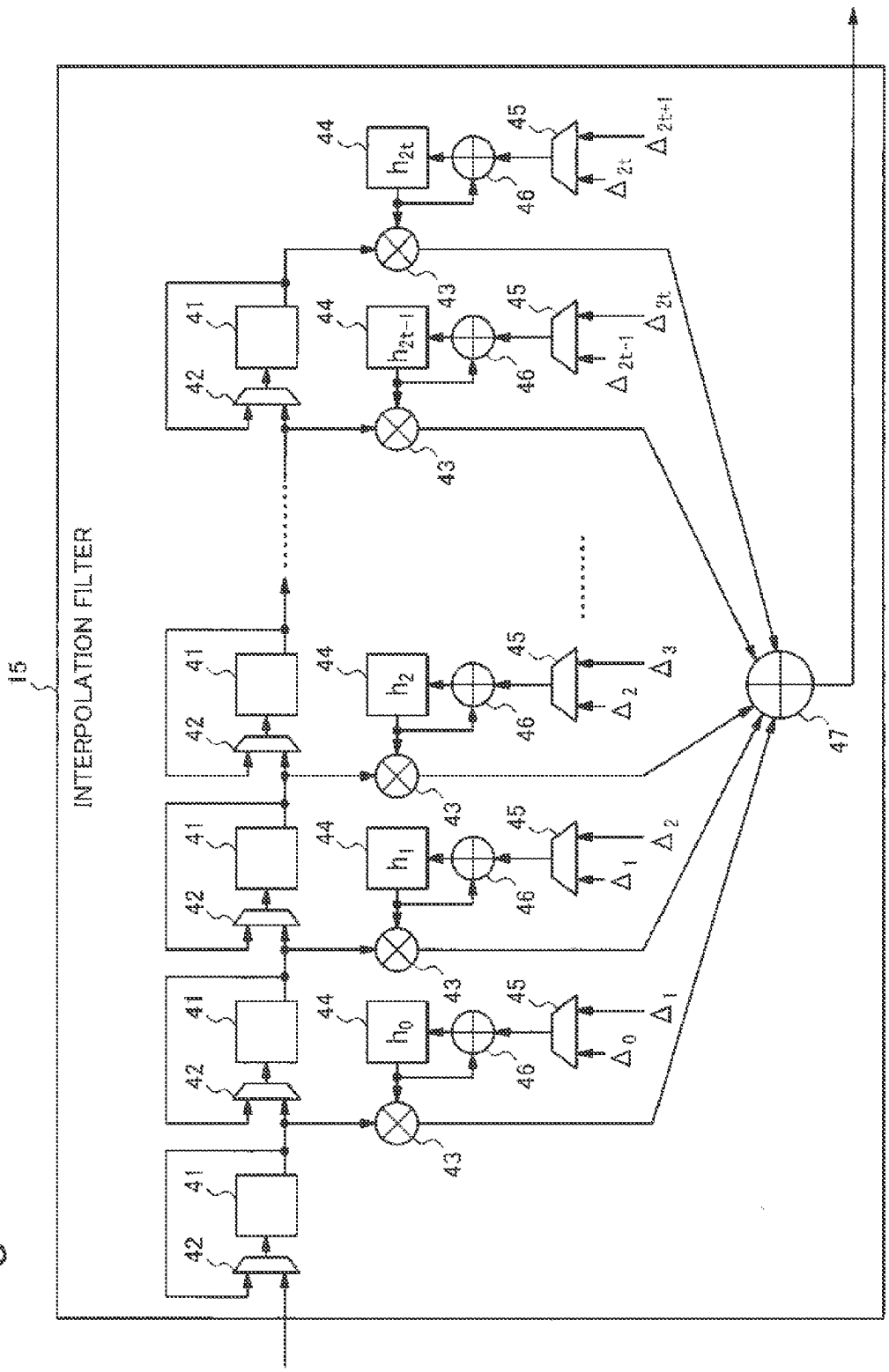
FIG. 2 is a block diagram showing a configuration of an interpolation filter in a carrier wave reproduction device according to a first exemplary embodiment as an example.

FIG. 2 is a block diagram showing a configuration of the interpolation filter 15 in the carrier wave reproduction device 10 according to the exemplary embodiment as an example. Referring to FIG. 2, the interpolation filter 15 is a finite impulse response (FIR) type filter and includes registers 41 and 44, selectors 42 and 45, a multiplier 43, and adders 46 and 47.

Figure 3:
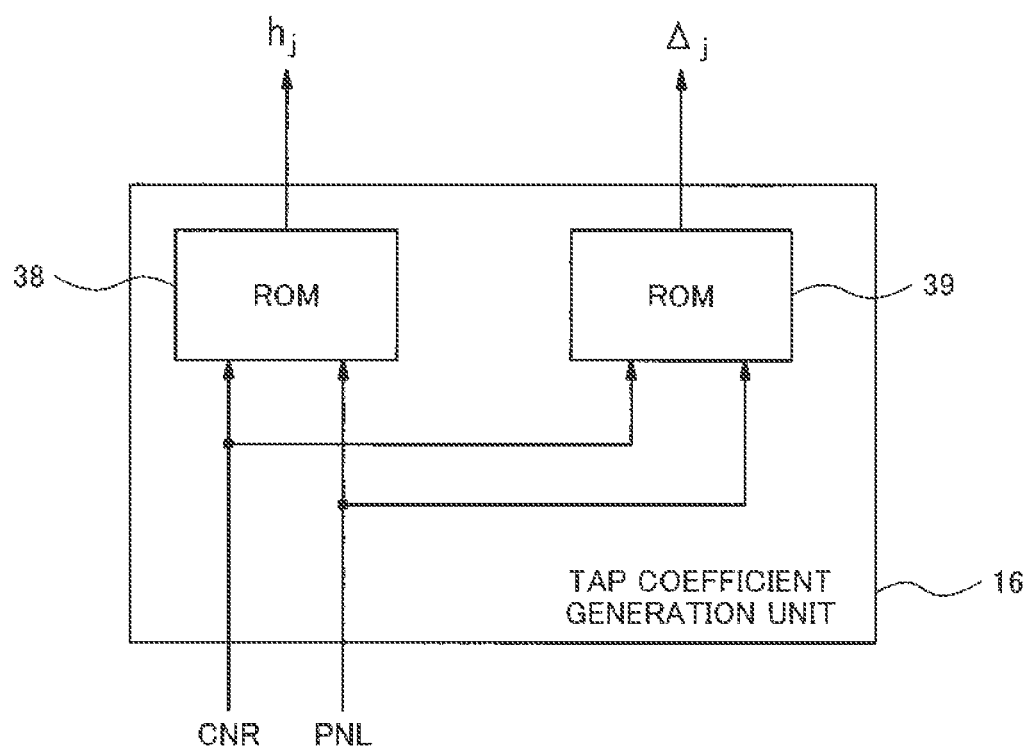
FIG. 3 is a block diagram showing a configuration of a tap coefficient generation unit in a carrier wave reproduction device according to a first exemplary embodiment as an example.

FIG. 3 is a block diagram showing a configuration of the tap coefficient generation unit 16 as an example. Referring to FIG. 3, the tap coefficient generation unit 16 includes a ROM table 38 which generates an initial value of a tap coefficient $h_j$ and a ROM table 39 which generates a step width $\Delta_j$ used when the tap coefficient $h_j$ is updated. The ROM table 38 receives a phase noise level (PNL) and a carrier to noise ratio (CNR) and outputs the initial value of the tap coefficient $h_j$ according to these values. On the other hand, the ROM table 39 receives the PNL and the CNR and outputs the step width $\Delta_j$ used when the tap coefficient $h_j$ is updated according to these values.

Next, the operation of the carrier wave reproduction device 10 will be described. The carrier wave reproduction device 10 receives the received symbol that corresponds to the Ich digitalized baseband signal and the Qch digitalized baseband signal obtained by passing through the A/D converter 13, compensates for the phase error included in the received symbol, and corrects the bit error due to disturbance such as residual phase noise, thermal noise, or the like through a process for decoding an error correction code. The carrier wave reproduction device 10 estimates the transmission bit string by performing the above-mentioned process and output it.

Figure 4:
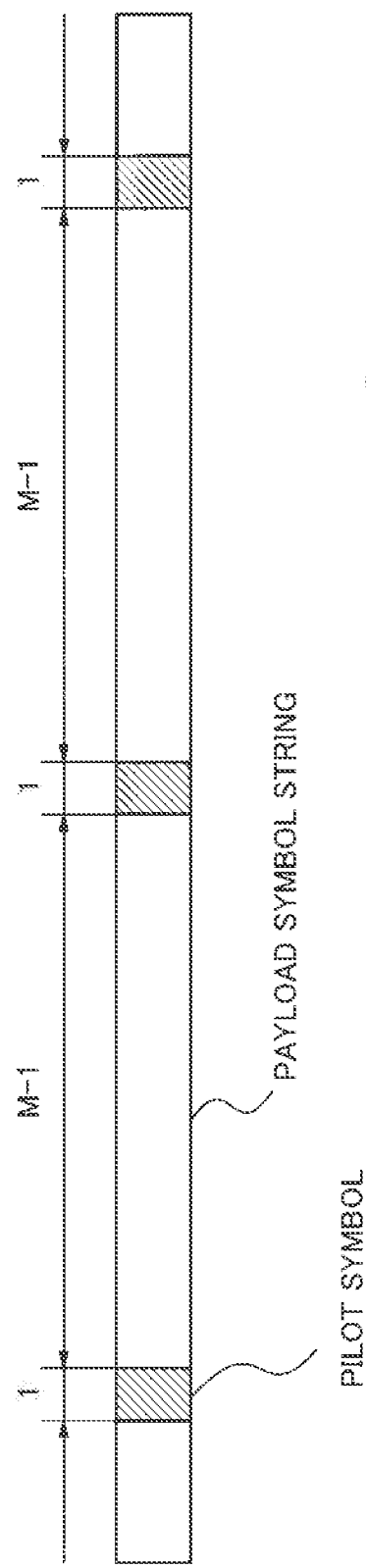
FIG. 4 is a figure showing a structure of a pilot symbol and a payload symbol in a first exemplary embodiment as an example.

FIG. 4 is a figure showing a structure of the input symbol string of the carrier wave reproduction device 10 as an example.

Referring to FIG. 4, the input symbol string is composed of a transmission data main body (payload) and a known pilot symbol determined in advance. In the following explanation, for ease of explanation, it is assumed that one pilot symbol is inserted for every M input symbols at a fixed interval. Here, M is a positive integer and indicates a pilot symbol interval.

The input symbol string to the carrier wave reproduction device 10 is inputted to the delay circuit 14. At the same time, only the received pilot symbol corresponding to the pilot symbol that is inserted for every M symbols is inputted to the interpolation filter 15. Namely, an input event to the interpolation filter 15 occurs once for every M times. Because the pilot symbol is the known symbol determined in advance, the phase error included in the reception pilot can be extracted by comparing the received pilot symbol with the symbol determined in advance. On the other hand, with respect to the payload symbol, because the transmission symbol is not known, an error occurs when the phase error is extracted.

The interpolation filter 15 is an FIR filter with (2t+1) taps (t is a positive integer) and estimates the phase error included in (M−1) payload symbols and one pilot symbol from (2t+1) input pilot symbols. A relation between the input pilot symbol and the payload symbol to estimate the phase error will be described in detail below.

It is assumed that the number of symbols inputted to the carrier wave reproduction device 10 is one symbol per one unit time, (2tM+1) input symbols are represented by $S_0, S_1, S_2, \ldots,$ and $S_{2tM}$ and in particular, the pilot symbols inserted for every M symbols are represented by $S_0, S_M, S_{2M}, S_{3M}, \ldots,$ and $S_{2tM}$. (2t+1) pilot symbols are successively inputted to the interpolation filter 15 and the interpolation filter 15 successively estimates the phase error included in the (M−1) payload symbols expressed by the following equation 1 and the pilot symbol $S_{tM}$ in the M unit time until a next pilot symbol $S_{(2t+1)M}$ is inputted after the last pilot symbol $S_{2tM}$ is inputted.

$$S_{tM-[(M-1)/2]}, \ldots, S_{tM-2}, S_{tM-1}, S_{tM+1}, S_{tM+2}, \ldots, S_{tM+[M/2]} \quad \text{[Equation 1]}$$

Further, in Equation 1, [M/2] indicates a maximum integer among integers equal to or smaller than M/2. Accordingly, when M is even, [M/2] is equal to M/2 and when M is odd, [M/2] is equal to (M−1)/2. This is similarly applied to [(M−1)/2].

The interpolation filter 15 estimates the phase error included in (M−1) payload symbols by updating the tap coefficient of the filter sequentially. The information required to update the tap coefficient is supplied from the tap coefficient generation unit 16. Accordingly, the delay amount of the delay circuit 14 is equal to or more than (tM+[(M−1)/2]) unit time.

The phase rotator 17 rotates the phase of the received symbol that is the output of the delay circuit 14 based on the output data of the interpolation filter 15 and outputs the received symbol. The received symbol is expressed by the complex value whose real part corresponds to the Ich baseband signal and whose imaginary part corresponds to the Qch baseband signal and similarly, the output data of the interpolation filter is also expressed by the complex value. Accordingly, as an example, the phase rotator 17 can be realized by a complex value multiplier. However, the phase rotator 17 is not limited to this.

The output symbol of the phase rotator 17 is the received symbol string in which the phase noise is corrected by the interpolation filter 15. However, when the phase noise level is high or when a pilot symbol interval M is large, a problem of the residual phase error occurs. Accordingly, the output symbol of the phase rotator 17 is compensated for by the phase error compensation unit 19 and the error correction decoder 32.

The phase error compensation unit 19 receives the output symbol of the phase rotator 17 via the buffer 18, estimates the phase error which remains in the output symbol, and corrects it.

The symbol used as the reference when the phase error compensation unit 19 estimates the phase error which remains in the output symbol is generated by using the error correction decoder 32. First, a process for correcting a bit error included in the output symbol of the phase rotator 17 is performed by the QAM symbol demapping unit 31 and the error correction decoder 32.

The QAM symbol demapping unit 31 receives the output symbol of the phase rotator 17 via the buffer 18 and the selector 30, generates the bit string in which the likelihood information is reflected to each bit of which the output symbol is composed, and outputs it to the error correction decoder 32.

The error correction decoder 32 receives the bit string, performs a first-time error correction decoding process, estimates the transmission bit string, and outputs the estimated transmission bit string to the phase error compensation unit 19.

The phase error compensation unit 19 uses the received estimated transmission bit string to estimate the residual phase error included in the output symbol of the phase rotator 17 and performs a second-time phase error compensation.

The received symbol to which the second-time phase error compensation is applied in the phase error compensation unit 19 is inputted to the error correction decoder 32 via the selector 30 and the QAM symbol demapping unit 31. The error correction decoder 32 performs a second-time error correction decoding process and estimates the transmission bit string.

Subsequently, a third-time phase error compensation process and a third-time error correction process are performed in a similar manner. Further, a fourth-time phase error compensation process, a fourth-time error correction process, a fifth-time phase error compensation process, and a fifth-time error correction process can be repeated. After the phase error compensation process and the error correction process are repeated a predetermined number of times, the carrier wave reproduction device 10 outputs the output data of the error correction decoder 32 as the output data of the carrier wave reproduction device 10.

It is expected that a certainty of the transmission bit estimated by the error correction decoder 32 and an accuracy of the phase error estimated by the phase error compensation unit 19 by using the estimated transmission bit are gradually improved when the phase error compensation process and the error correction process are repeated many times.

Figure 5:
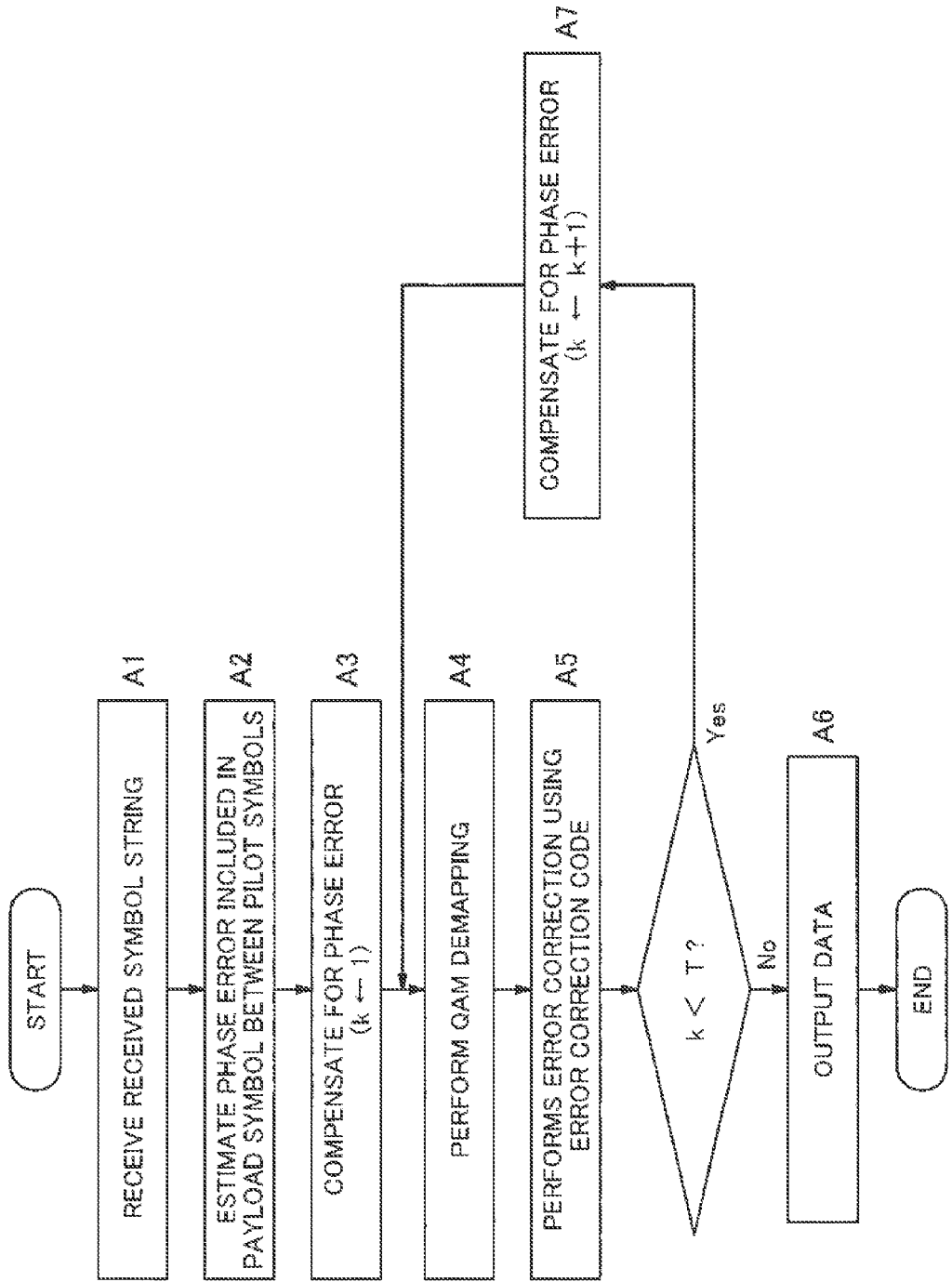
FIG. 5 is a flowchart showing operation of a carrier wave reproduction device according to a first exemplary embodiment as an example.

FIG. 5 is a flowchart showing the operation of the carrier wave reproduction device 10 as an example. Namely, it shows the operations performed until the output data is generated after the received symbol is inputted.

Referring to FIG. 5, the carrier wave reproduction device 10 receives the received symbol outputted from the A/D converter 13 (Step A1).

The interpolation filter 15 uses only the pilot symbol in the received symbol string and estimates the phase error included in the payload symbol between the pilot symbols by the interpolation process (Step A2).

Next, the phase rotator 17 performs the first-time phase error compensation (Step A3).

The QAM symbol demapping unit 31 performs demapping of the received symbol to which the phase error compensation is performed to the bit string (Step A4) and the error correction decoder 32 performs an error correction using the error correction code (Step A5).

When the number of phase error compensation times k is equal to or greater than the number of times T set in advance (k and T are positive integers) or when all the errors are successfully corrected by the error correction (Step A5), the data to which the error correction is performed (Step A5) is used as the output of the carrier wave reproduction device 10 (Step A6).

On the other hand, when the number of phase error compensation times k is smaller than the number of times T set in advance, a (k+1)th-time phase error compensation is performed (Step A7). Further, in the phase error compensation (Step A7), the output obtained through the error correction decoding (Step A5) is used as the reference data. Therefore, the phase error compensation (Step A7) is different from the phase error compensation (Step A3) performed by the phase rotator 17 based on the interpolation between pilots (Step A2).

The operation of the interpolation filter 15 shown in FIG. 2 will be described by using the flowchart shown in FIG. 6.

As shown in FIG. 4, it is assumed that the input symbol string is composed of the payload symbol and the pilot symbol and one pilot symbol is inserted for every M input symbols at a fixed interval. At this time, the input event to the interpolation filter 15 occurs once for every M times.

Figure 6:
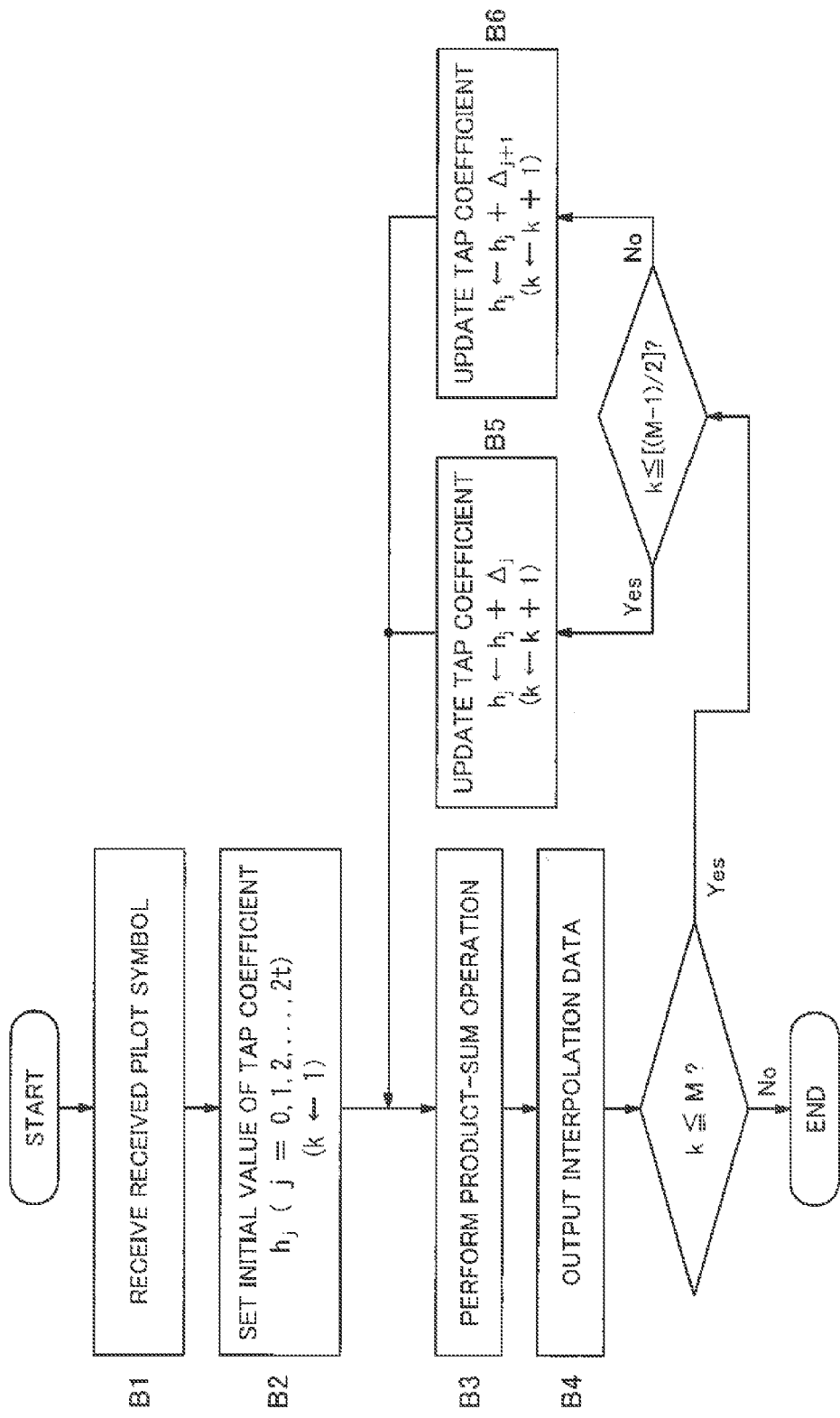
FIG. 6 is a flowchart showing operation of an interpolation filter in a carrier wave reproduction device according to a first exemplary embodiment as an example.

Referring to FIG. 6, the received pilot symbol is inputted to the interpolation filter 15 (Step B1) and set to the leftmost register among registers 41 shown at an upper side of FIG. 2.

Further, the initial value is set to each register 44 which holds the tap coefficient (Step B2).

When the inputted received pilot symbol is represented by $S_{nM}$ (n is an integer), the received pilot symbol string held in the registers 41 is represented by $S_{nm}$, $S_{(n-1)M}$, ..., and $S_{(n-2t)M}$ in order from the leftmost register to the rightmost register. The received pilot symbols are multiplied by the tap coefficients $h_0, h_1 ..., $ and $h_{2t}$ by the multipliers 43, respectively and the sum is calculated by the adder 47 (Step B3).

The interpolation filter 15 outputs the calculated sum as the interpolation data (Step B4). The interpolation data is expressed by the following equation 2.

$$\sum_{i=0}^{2t} h_i \cdot S_{(n-i)M} \qquad \text{[Equation 2]}$$

The interpolation filter 15 repeats the above-mentioned product-sum operation shown by equation 2 M times while updating the tap coefficients $h_0, h_1, ..., $ and $h_{2t}$. The update of the tap coefficient is performed by a method to update the tap coefficient (step B5) and a method to update the tap coefficient (Step B6) shown in FIG. 6. When the tap coefficient is updated in the steps B5 and B6, the step widths ($\Delta_j$, $\Delta_{j+1}$) that are values set in advance are added to the latest tap coefficient. However, the step width used in the step B5 is different from the step width used in the step B6.

After a (k)th-time product-sum operation is performed, if k<=[(M−1)/2], the interpolation filter 15 performs the tap coefficient update process of step B5 and if k>[(M−1)/2], the interpolation filter 15 performs the tap coefficient update process of Step B6. The interpolation filter 15 updates the tap coefficient by using the registers 44, the adders 46, and the selectors 45 connected to the adders 46 shown in FIG. 2. The selector 45 selects one of the tap coefficient update process of step B5 and the tap coefficient update process of Step B6.

Further, the initial value of the tap coefficient $h_j$ set in Step B2 and the step width $\Delta_j$ used when the tap coefficient is updated in Steps B5 and B6 are determined based on the phase noise level (PNL) and the carrier to noise ratio (CNR) by the thermal noise and supplied from the tap coefficient generation unit 16.

Exemplary Embodiment 2

A carrier wave reproduction device according to a second exemplary embodiment will be described with reference to the drawing. FIG. 7 is a block diagram showing a configuration of a demodulation device 20a equipped with the carrier wave reproduction device 10a according to the exemplary embodiment as an example.

The reference oscillator 11, the detector 12, and the A/D converter 13 that are used for the demodulation device 20 (FIG. 1) according to the first exemplary embodiment are also used for the demodulation device 20a. Further, the delay circuit 14, the interpolation filter 15, the tap coefficient generation device 16, the phase rotator 17, the buffer 18, the selector 30, the QAM symbol demapping unit 31, and the error correction decoder 32 that are used for the carrier wave reproduction device 10 (FIG. 1) according to the first exemplary embodiment are also used for the carrier wave reproduction device 10a.

Referring to FIG. 7, the phase error compensation unit 19a includes the QAM symbol mapping unit 51, the phase error detector 52, the loop filter 53, the numerical control oscillator 54, and the phase rotator 55.

The QAM symbol mapping unit 51 generates a replica of the transmission symbol sequence corresponding to the output data from the output data of the error correction decoder 32 and outputs it to the phase error detector 52.

The phase error detector 52 detects the phase difference between the output symbol of the phase rotator 55 and the output symbol of the QAM symbol mapping unit 51 and outputs it to the loop filter 53.

The loop filter 53 removes the high frequency noise included in the output of the phase error detector 52 and outputs it to the numerical control oscillator 54.

The numerical control oscillator 54 calculates the phase rotation amount from the output of the loop filter 53 and outputs it to the phase rotator 55.

Here, the phase error detector 52, the loop filter 53, the numerical control oscillator 54, and the phase rotator 55 are connected so as to form a loop.

Next, the operation of the carrier wave reproduction device 10a shown in FIG. 7 will be described. Here, the delay circuit 14, the interpolation filter 15, the tap coefficient generation unit 16, the phase rotator 17, the buffer 18, the selector 30, the QAM symbol demapping unit 31, and the error correction decoder 32 that are used for the carrier wave reproduction device 10 (FIG. 1) according to the first exemplary embodiment are also used for the carrier wave reproduction device 10a. Accordingly, the operation of inputting the received symbol to the carrier wave reproduction device 10a, the operations of the delay circuit 14, the interpolation filter 15, the tap coefficient generation unit 16, and the phase rotator 17, and the operations of the QAM symbol demapping unit 31 and the error correction decoder 32 are the same as those of the carrier wave reproduction device 10 (FIG. 1) according to the first exemplary embodiment. Therefore, an explanation of these operations is omitted.

The QAM symbol mapping unit 51 generates the replica of the transmission symbol by mapping the output data of the error correction decoder 32 to the signal point in the QAM method.

When the $2^m$-QAM method is used as the modulation method, each replica of the transmission symbol outputted by the QAM symbol mapping unit 51 corresponds to one of the complex values indicating $2^m$ signal points of the QAM method.

Further, when the error correction decoder 32 is a soft output decoder which outputs likelihood information indicating a certainty of the data after correction together with the data after correction, the symbol outputted by the QAM symbol mapping unit 51 is a value obtained by summing the transmission symbols that are weighted by using the likelihood information. In this case, the output of the QAM symbol mapping unit 51 does not necessarily correspond to one of the complex values representing $2^m$ signal points of the QAM method.

The phase error detector 52 receives the replica of the transmission symbol generated by the QAM symbol mapping unit 51. Moreover, the phase error detector 52 receives the received symbol whose phase error is compensated for by the interpolation filter process via the phase rotator 55. The received symbol is represented by a complex number α and the replica of the transmission symbol generated by the QAM symbol mapping unit 51 is represented by a complex number β. When a real part of a complex number x is represented by Re(x) and an imaginary part of a complex number x is represented by Im(x), the output value of the phase error detector 52 is expressed by equation 3.

$$\frac{1}{|\alpha|}\{Im(\alpha)\cdot Re(\beta) - Re(\alpha)\cdot Im(\beta)\} \quad \text{[Equation 3]}$$

When an argument of the complex number α is represented by $\theta_\alpha$ and an argument of the complex number β is represented by $\theta_\beta$, Equation 3 is rewritten to Equation 4.

$$|\beta|\sin(\theta_\alpha-\theta_\beta) \quad \text{[Equation 4]}$$

Accordingly, the output value of the phase error detector 52 that is calculated by Equation 3 is a value corresponding to the phase difference between two input symbols. The phase error detector 52 outputs the output value to the loop filter 53.

Figure 8:
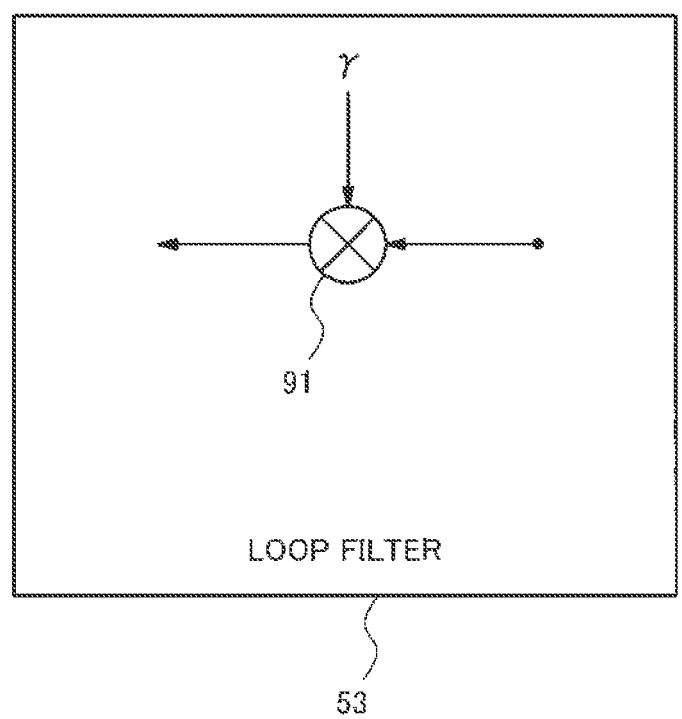
FIG. 8 is a figure showing a configuration of a loop filter in a carrier wave reproduction device according to a second exemplary embodiment as an example.

FIG. 8 is a figure showing a configuration of the loop filter 53 as an example. Referring to FIG. 8, the loop filter 53 includes a multiplier 91. The loop filter 53 multiplies the input value expressed by Equation 3 by a constant number γ and outputs a calculation result. The constant number γ can be adaptively changed according to discrimination between the pilot symbol and the payload symbol, the number of phase error compensation times, or the like. The loop filter 53 outputs the output value to the numerical control oscillator 54.

Figure 9:
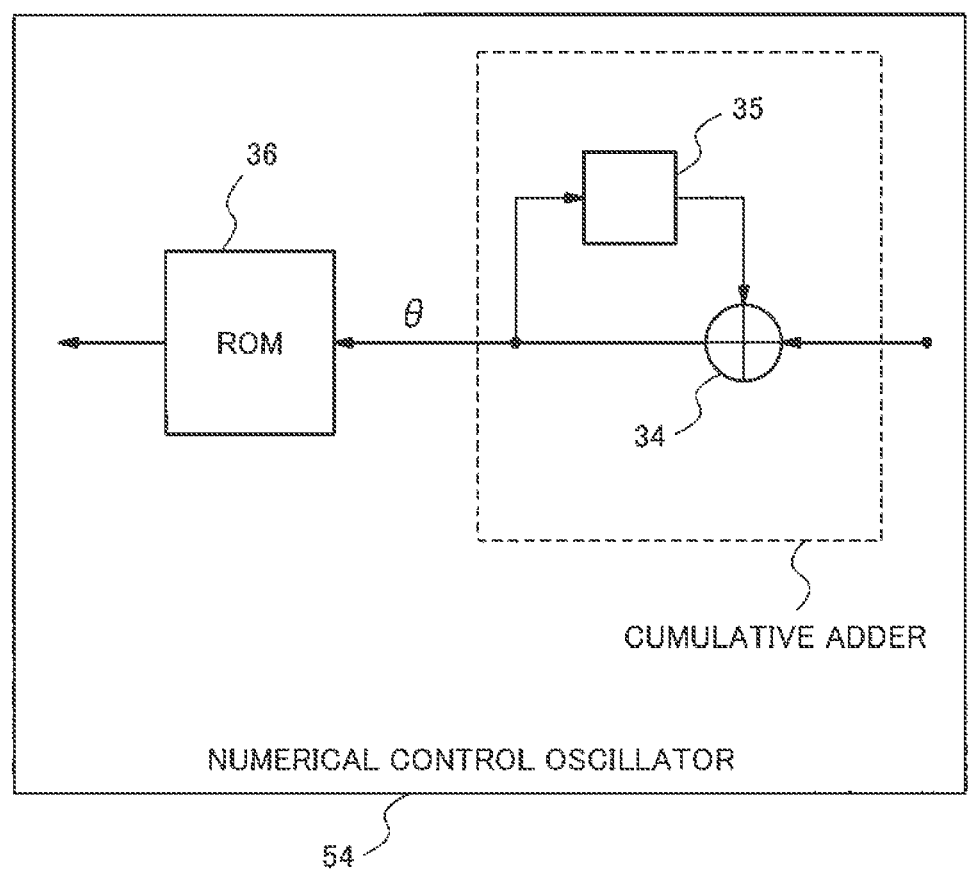
FIG. 9 is a block diagram showing a configuration of a numerical control oscillator in a carrier wave reproduction device according to a second exemplary embodiment as an example.

FIG. 9 is a block diagram showing a configuration of the numerical control oscillator 54 as an example. Referring to FIG. 9, the numerical control oscillator 54 includes a cumulative adder composed of an adder 34 and a register 35 and a ROM table 36 which converts a cumulative addition result δ into a value of cos(θ) and a value of sin(θ).

The numerical control oscillator 54 adds the data held in the register 35 to the input data and updates the data held in the register 35 with the addition result. The addition result is converted into a cosine function value and a sine function value and these values are outputted to the phase rotator 55 by the ROM table 36.

The phase rotator 55 outputs the symbol α obtained by rotating the phase of a symbol α' by an angle of −θ according to Equation 5 based on the output symbol α' of the buffer 18 and the output values (cos(θ) and sin(θ)) of the numerical control oscillator 54.

$$Re(\alpha)=\cos(\theta)\cdot Re(\alpha')+\sin(\theta)Im(\alpha')$$

$$Im(\alpha)=\cos(\theta)\cdot Im(\alpha')-\sin(\theta)\cdot Re(\alpha') \quad \text{[Equation 5]}$$

The phase rotator 55, the phase error detector 52, the loop filter 53, and the numerical control oscillator 54 are connected so as to form a loop as shown in FIG. 7.

The received symbol to which the second-time phase error compensation is applied by the phase rotator 55 is inputted to the error correction decoder 32 via the selector 30 and the QAM symbol demapping unit 31.

The error correction decoder 32 performs the second-time error correction decoding process and estimates the transmission bit string. The transmission bit string is supplied to the phase error detector 52 through the QAM symbol mapping unit 51 in a similar way to that previously used. The output symbol of the buffer 18 is supplied to the phase error detector 52 via the phase rotator 55 as the other input. Not only the way of supplying the output symbol but also the symbol value supplied from the buffer 18 is the same as that of the previous time.

It is expected that the number of errors included in the replica of the transmission symbol supplied through the QAM symbol mapping unit 51 is smaller than the number of errors included in the replica of the transmission symbol at the last time. By this effect, the phase error compensation can be performed with high accuracy compared to the second-time phase error compensation. Subsequently, the same process is performed. Therefore, the phase noise can be compensated for with more high accuracy by repeatedly updating the replica of the transmission symbol.

Figure 10:
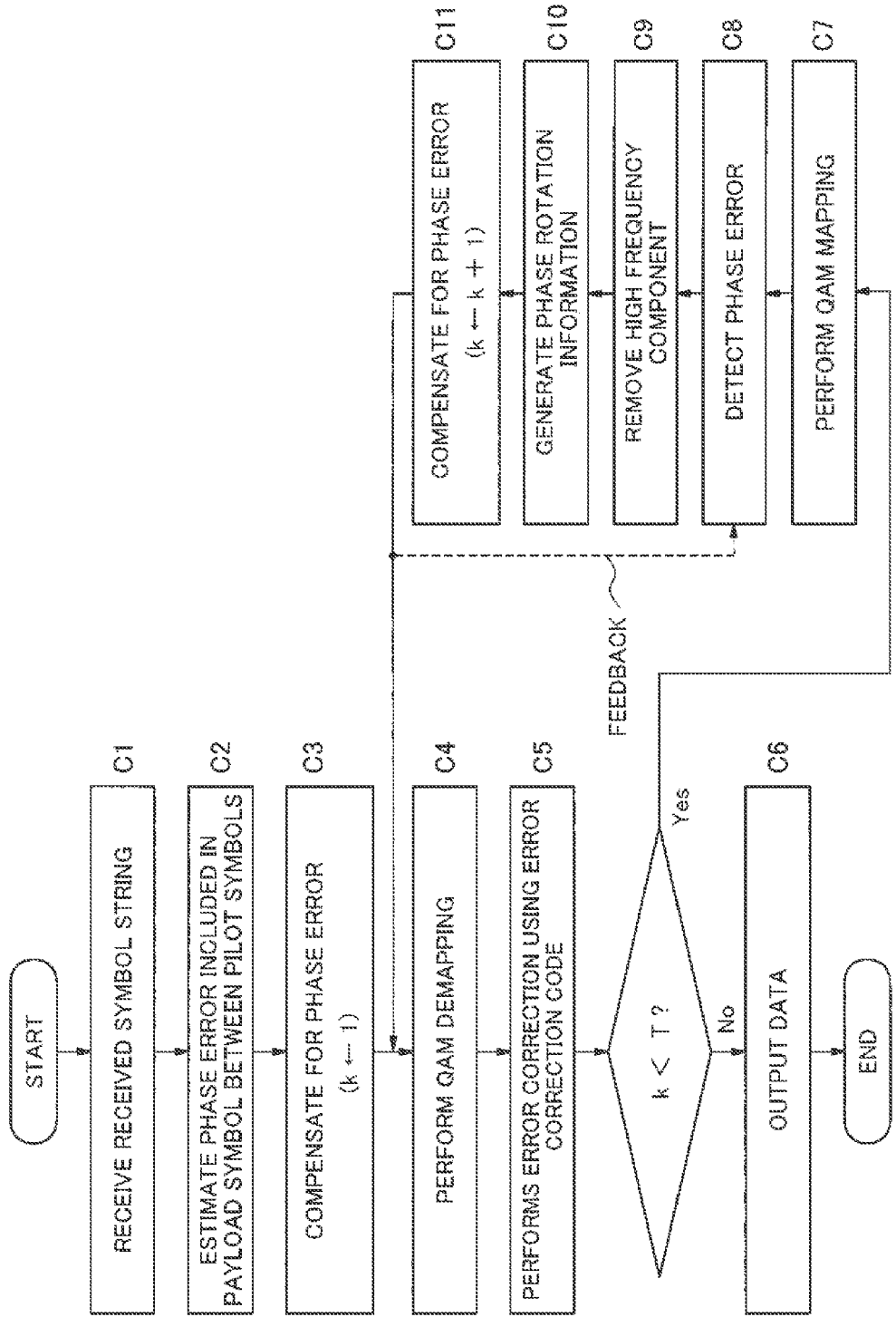
FIG. 10 is a flowchart showing operation of a carrier wave reproduction device according to a second exemplary embodiment as an example.

FIG. 10 is a flowchart showing the operation of the carrier wave reproduction device 10a according to the exemplary embodiment equipped with the phase error compensation unit 19a as an example. Namely, it shows the operations performed until the output data is obtained after the received symbol is inputted.

Referring to FIG. 10, the carrier wave reproduction device 10a receives the received symbol outputted from the A/D converter 13 (Step C1).

The interpolation filter 15 uses only the pilot symbol in the received symbol string and estimates the phase error included in the payload symbol between the pilot symbols by the interpolation process (Step C2).

Next, the phase rotator 17 performs the first-time phase error compensation (Step C3).

The QAM symbol demapping unit 31 performs demapping of the received symbol to which the phase error compensation is performed to the bit string (Step C4) and the error correction decoder 32 performs the error correction using the error correction code (Step C5).

When the number of phase error compensation times k is equal to or greater than the number of times T set in advance (k and T are positive integers) or when all the errors are successfully corrected by the error correction (Step C5), the data to which the error correction is performed (Step C5) is used as the output of the carrier wave reproduction device 10a (Step C6).

On the other hand, when the number of phase error compensation times k is smaller than the number of times T set in advance, the QAM symbol mapping unit 51 creates the replica of the transmission symbol by mapping the data to which the error correction is performed (Step C5) to the QAM symbol (Step C7).

Next, the phase error detector 52 uses the replica of the transmission symbol as the reference symbol and detects the phase error (Step C8).

Next, the loop filter 53 removes the high frequency component of the detected phase error (Step C9).

Next, the numerical control oscillator 54 converts the phase error information from which the high frequency component is removed and generates phase rotation information (Step C10).

Next, the phase rotator 55 performs the (k+1)th-time phase error compensation according to the phase rotation information (Step C11).

Further, as shown in FIG. 7, in the (k+1)th-time phase error compensation, when the operation is viewed in symbol unit, the feedback is performed for the phase error detection performed by the phase error detector 52.

Exemplary Embodiment 3

A carrier wave reproduction device according to a third exemplary embodiment will be described with reference to the drawing. FIG. 11 is a block diagram showing a configuration of a demodulation device 20b equipped with the carrier wave reproduction device 10b according to the exemplary embodiment as an example.

Referring to FIG. 11, the reference oscillator 11, the detector 12, and the A/D converter 13 that are used for the demodulation device 20 (FIG. 1) according to the first exemplary embodiment are also used for the demodulation device 20b.

The delay circuit 14, the interpolation filter 15, the tap coefficient generation device 16, the phase rotator 17, the buffer 18, the selector 30, the QAM symbol demapping unit 31, and the error correction decoder 32 that are used for the carrier wave reproduction device 10 (FIG. 1) according to the first exemplary embodiment are also used for the carrier wave reproduction device 10b.

Referring to FIG. 11, the phase error compensation unit 19b includes the phase rotator 61, the QAM symbol mapping unit 62, the phase error detector 63, and the low pass filter 64.

The phase rotator 61 receives the output of the phase rotator 17 via the buffer 18 and rotates the phase thereof by using the output of the low pass filter 64 described later.

The output of the phase rotator 61 is inputted to the QAM symbol demapping unit 31 via the selector 30.

The QAM symbol mapping unit 62 generates the replica of the transmission symbol sequence corresponding to the output data from the output data of the error correction decoder 32 and outputs it to the phase error detector 63.

The phase error detector 63 detects the phase difference between the output symbol of the buffer 18 and the output symbol of the QAM symbol mapping unit 62 and outputs it to the low pass filter 64.

The low pass filter 64 performs the averaging of the output of the phase error detector 63 and outputs it to the phase rotator 61.

Next, the operation of the carrier wave reproduction device 10b will be described. The delay circuit 14, the interpolation filter 15, the tap coefficient generation device 16, the phase rotator 17, the buffer 18, the selector 30, the QAM symbol demapping unit 31, and the error correction decoder 32 that are used for the carrier wave reproduction device 10 (FIG. 1) according to the first exemplary embodiment are also used for the carrier wave reproduction device 10b. Accordingly, the operation of inputting the received symbol to the carrier wave reproduction device 10b, the operations of the delay circuit 14, the interpolation filter 15, the tap coefficient generation unit 16, and the phase rotator 17, and the operations of the QAM symbol mapping unit 62 and the error correction decoder 32 are the same as those of the carrier wave reproduction device 10 (FIG. 1) according to the first exemplary embodiment. Therefore, the explanation of these operations is omitted.

The QAM symbol mapping unit 62 generates the replica of the transmission symbol by mapping the output data of the error correction decoder 32 to the signal point in the QAM method.

The QAM symbol mapping unit 62 is the same as the QAM symbol mapping unit 51 provided in the phase error compensation unit 19a of the carrier wave reproduction device 10a (FIG. 7) according to the second exemplary embodiment.

The phase error detector 63 receives the replica of the transmission symbol generated by the QAM symbol mapping unit 62 as one of two inputs like the phase error detector 52 provided in the carrier wave reproduction device 10a (FIG. 7) according to the second exemplary embodiment. In the second exemplary embodiment, the phase error detector 52 receives the output symbol of the phase rotator 55 as the other input. In this exemplary embodiment, the phase error detector 63 receives the output symbol of the buffer 18 which holds the received symbol that is corrected by the interpolation filter 15 as the other input.

When the output symbol of the buffer 18 is represented by the complex number α and the replica of the transmission symbol outputted by the QAM symbol mapping unit 62 is represented by the complex number β, the output value of the phase error detector 63 is expressed by Equation 3 like the second exemplary embodiment.

Figure 12:
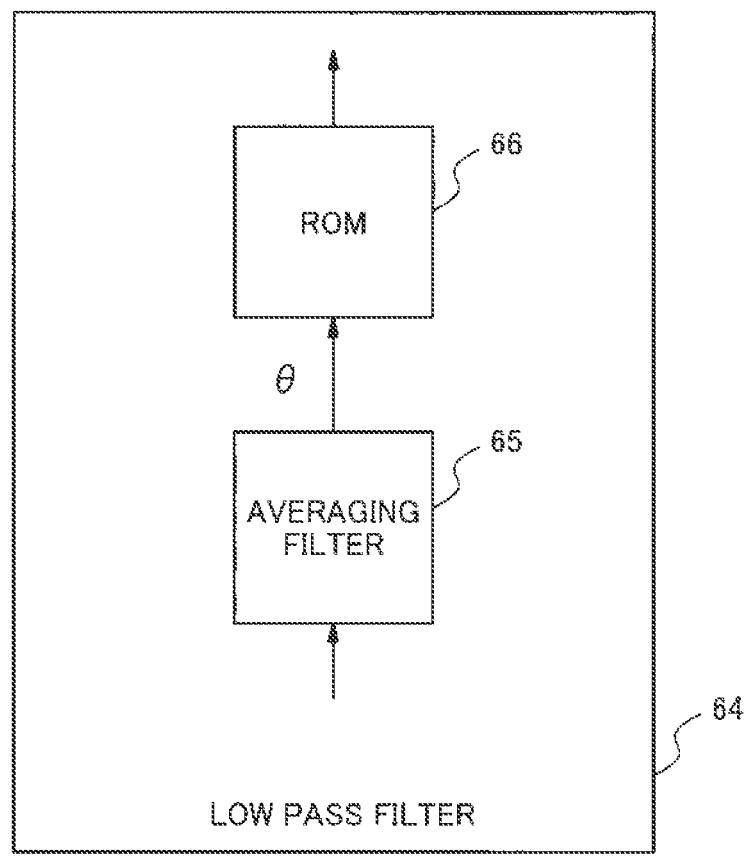
FIG. 12 is a block diagram showing a configuration of a low path filter in a carrier wave reproduction device according to a third exemplary embodiment as an example.

FIG. 12 is a block diagram showing a configuration of the low pass filter 64 as an example. Referring to FIG. 12, the low pass filter 64 includes an averaging filter 65 which performs the averaging of the output of the phase error detector 63 and a ROM table 66 which converts the output value θ of the averaging filter 65 into a set of a cosine function value and a sine function value ($\cos(\theta)$ and $\sin(\theta)$) and outputs it.

The output data of the ROM table 66 is used for the phase rotation of the output symbol of the buffer 18 in the phase rotator 61. When the output symbol of the buffer 18 is represented by α' and the output of the averaging filter 65 is represented by θ, the phase rotator 61 rotates the phase according to equation 4 and outputs the symbol α.

The received symbol to which the second-time phase error compensation is applied by the phase rotator 61 is inputted to the error correction decoder 32 via the selector 30 and the QAM symbol demapping unit 31 like the carrier wave reproduction device 10a shown in FIG. 7.

The error correction decoder 32 performs the second-time error correction decoding and estimates the transmission bit string. The transmission bit string is supplied to the phase error detector 63 through the QAM symbol mapping unit 62 in a similar way to that previously used. The output symbol of the buffer 18 is supplied to the phase error detector 63 as the other input. Not only the way of supplying the output symbol but also the symbol value supplied from the buffer 18 is the same as that of the previous time.

It is expected that the number of the errors included in the replica of the transmission symbol supplied through the QAM symbol mapping unit 62 is smaller than the number of the errors included in the replica of the transmission symbol at the last time. By this effect, the phase error compensation can be performed with high accuracy compared to the second-time phase error compensation. Subsequently, the same process is performed. Therefore, the phase noise can be compensated for with more high accuracy by repeatedly updating the replica of the transmission symbol.

Figure 13:
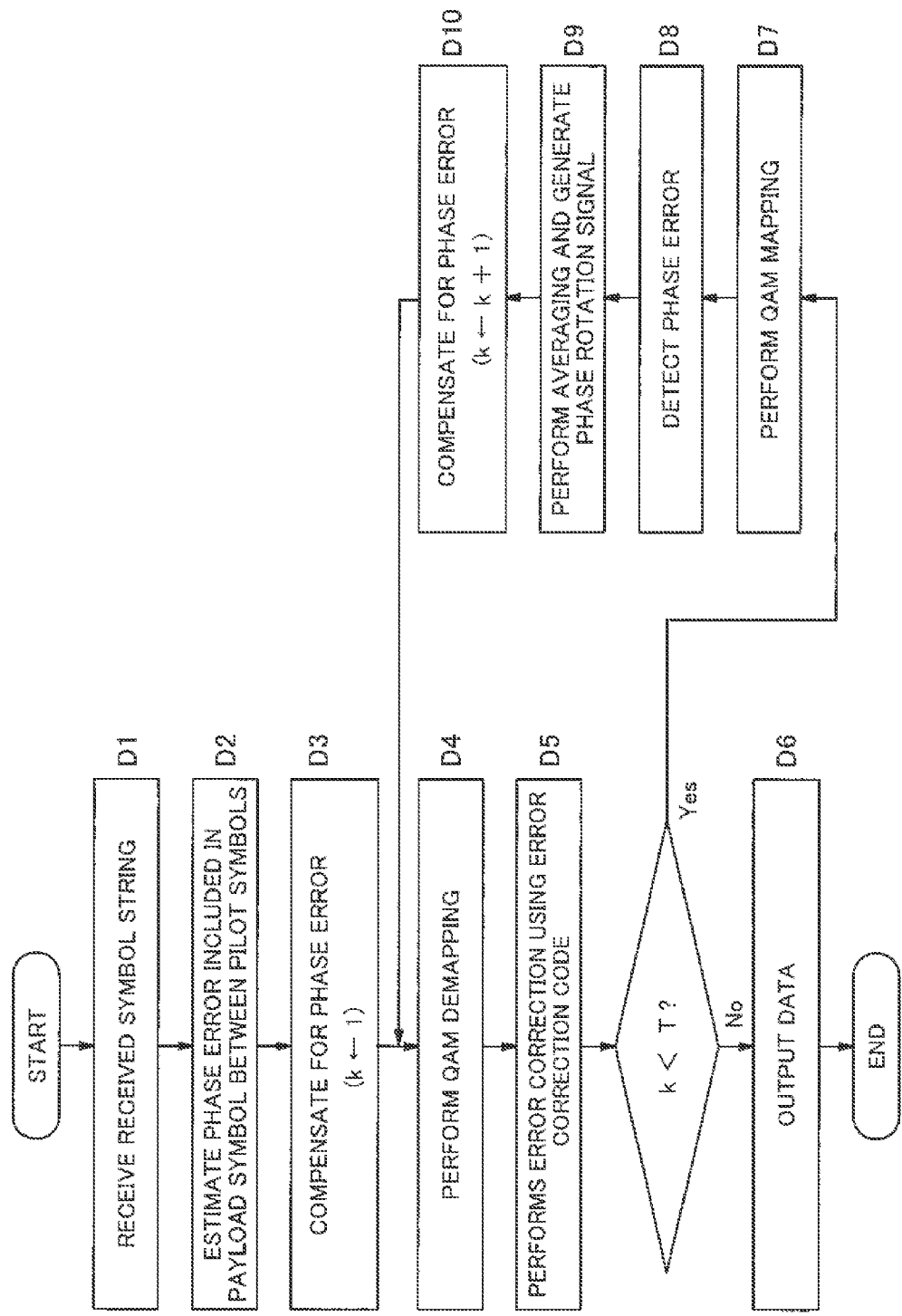
FIG. 13 is a flowchart showing operation of a carrier wave reproduction device according to a second exemplary embodiment as an example.
Figure 14:
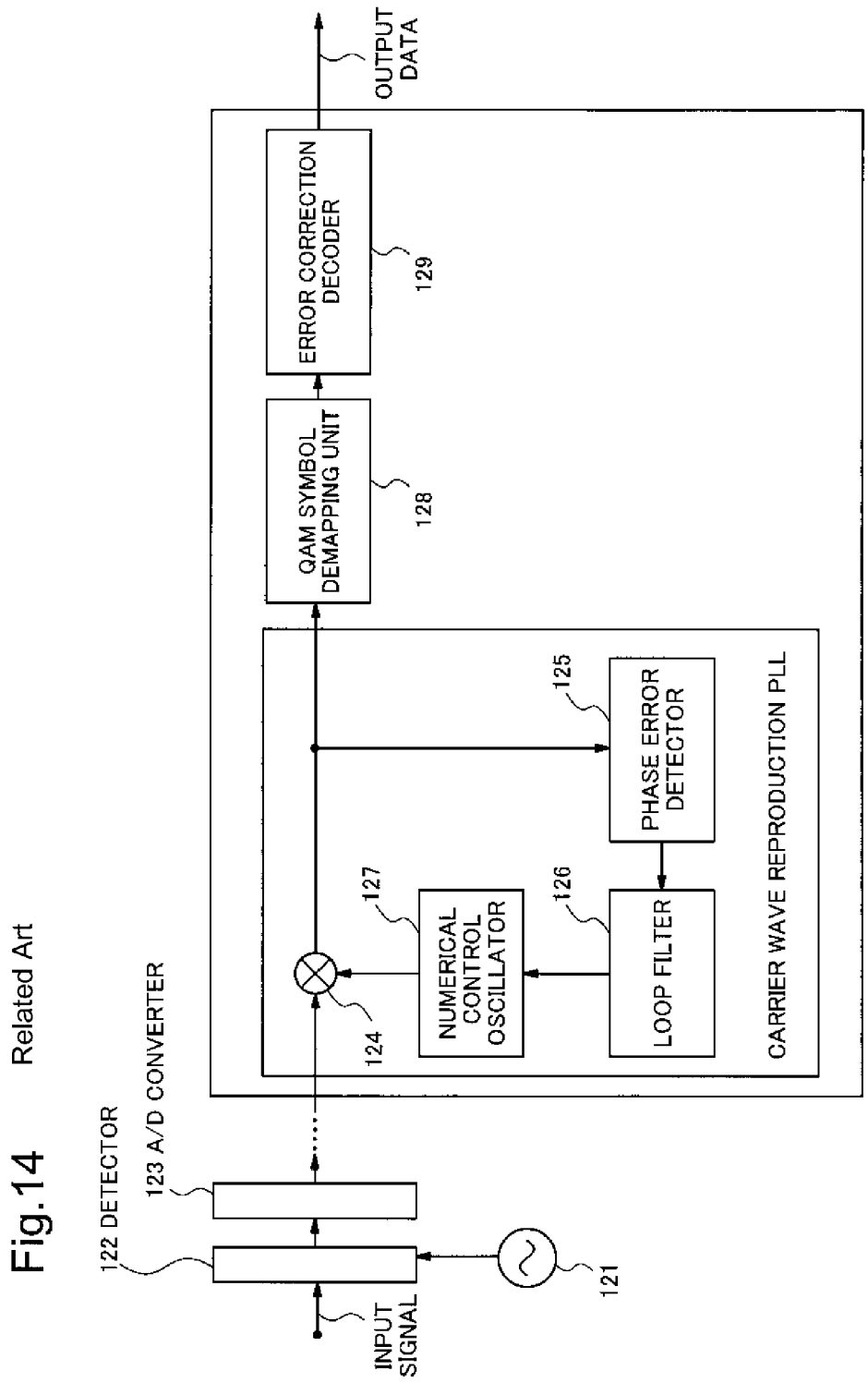
FIG. 14 is a block diagram showing a configuration of a carrier wave reproduction device according to a related technology.
Figure 15:
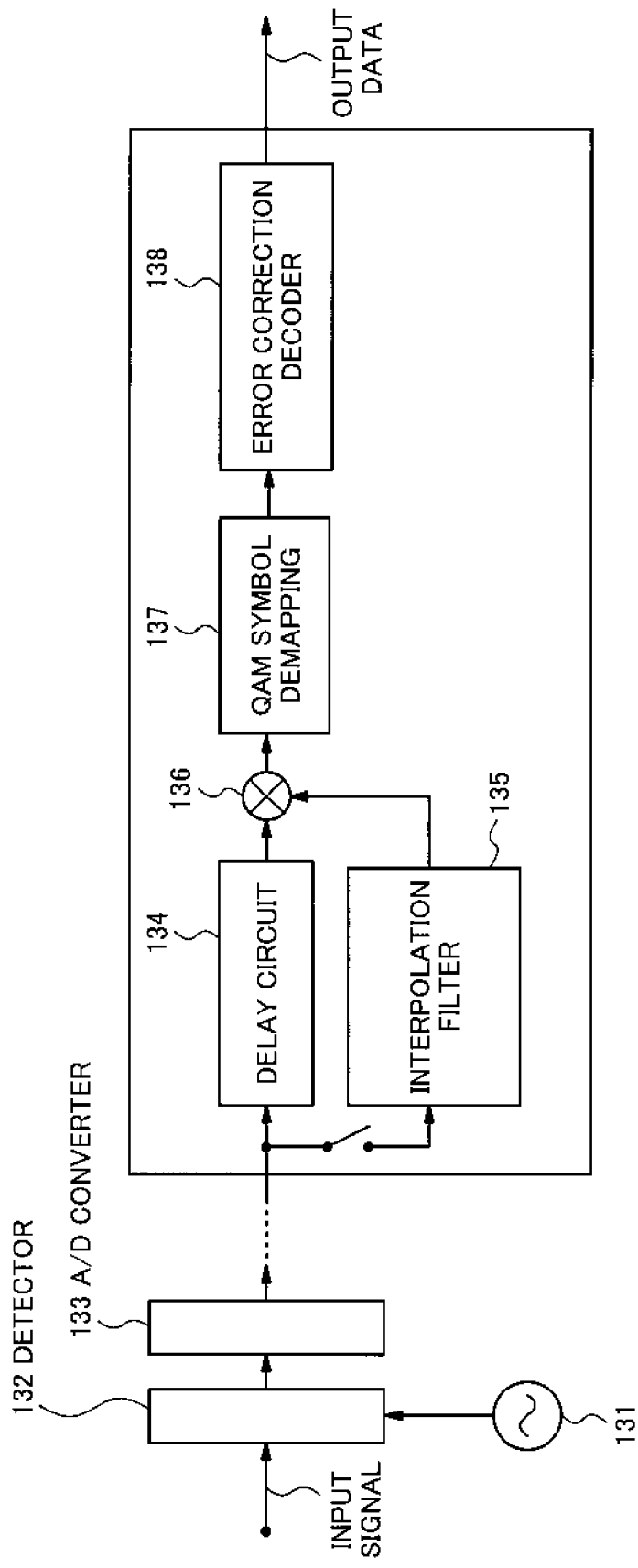
FIG. 15 is a block diagram showing a configuration of a carrier wave reproduction device according to a related technology.

FIG. 13 is a flowchart showing the operation of the carrier wave reproduction device 10b according to the exemplary embodiment equipped with the phase error compensation unit 19b as an example. Namely, it shows the operations performed until the output data is obtained after the received symbol is inputted.

Referring to FIG. 13, the carrier wave reproduction device 10b receives the received symbol outputted from the A/D converter 13 (Step D1).

The interpolation filter 15 uses only the pilot symbol in the received symbol string and estimates the phase error included in the payload symbol between the pilot symbols by the interpolation process (Step D2).

Next, the phase rotator 17 performs the first-time phase error compensation (Step D3).

The QAM symbol demapping unit 31 performs demapping of the received symbol to which the phase error compensation is performed to the bit string (Step D4) and the error correction decoder 32 performs an error correction using the error correction code (Step D5).

When the number of phase error compensation times k is equal to or greater than the number of times T set in advance (k and T are positive integers) or when all the errors are successfully corrected by the error correction (Step D5), the data to which the error correction is performed (Step D5) is used as the output of the carrier wave reproduction device 10b (Step D6).

On the other hand, when the number of phase error compensation times k is smaller than the number of times T set in advance, the QAM symbol mapping unit 62 creates the replica of the transmission symbol by mapping the data to which the error correction is performed (Step D5) to the QAM symbol (Step D7).

Next, the phase error detector 63 uses the replica of the transmission symbol as the reference symbol and detects the phase error (Step D8).

Next, the low pass filter 64 performs the averaging of the detected phase error and generates a phase rotation signal (Step D9).

Next, the phase rotator 61 performs the (k+1)th-time phase error compensation by using the phase rotation signal (Step D10).

The exemplary embodiment of the present invention has been explained above with reference to the drawing. The configuration described in the drawing is shown as an example. Therefore, the present invention is not limited to the configuration described in the drawing.

The carrier wave reproduction device according to the present invention can be suitably applied to a digital wireless communication device including a portable terminal device and a backbone wireless device.

Further, the disclosure of the prior art document such as the above-mentioned patent literature or the like is incorporated by reference. Modification and adjustment of the exemplary embodiment can be made within the scope of the overall disclosure (including claims) of the present invention, and based on the basic technical concept of the invention. Moreover, various combinations or selections of the various disclosed elements (including each element of each claim, each element of each exemplary embodiment, and each element or the like of each drawing) are possible within the scope of the claims of the present invention. Namely, modification and adjustment that can be conceived by those skilled in the art can be made within the scope of the overall disclosure including claims of the present invention, and based on the basic technical concept of the invention. With respect to a range of the value described in this document, it is interpreted that even when an arbitrary value or a small range included in the range is not specifically described, it is specifically described.

REFERENCE SIGNS LIST

10, 10a, and 10b carrier wave reproduction device
11, 121, and 131 reference oscillator
12, 122, and 132 detector
13, 123, and 133 A/D converter
14 and 134 delay circuit
15 and 135 interpolation filter
16 tap coefficient generation unit
17, 55, 61, 124, and 136 phase rotator
18 buffer
19, 19a, and 19b phase error compensation unit
20, 20a, and 20b demodulation device
30, 42, and 45 selector
31, 128, and 137 QAM symbol demapping unit
32, 129, and 138 error correction decoder
34, 46, and 47 adder
35, 41, and 44 register
36, 38, 39, and 66 ROM (read only memory) table
43 and 91 multiplier
51 and 62 QAM symbol mapping unit
52 and 63 phase error detector (with reference signal input)
53 and 126 loop filter
54 and 127 numerical control oscillator
64 low pass filter
65 averaging filter
125 phase error detector

The invention claimed is:

1. A carrier wave reproduction device including
an interpolation filter which estimates a phase error of a received symbol based on a pilot symbol included in the received symbol,
a first phase rotator which rotates the phase of the received symbol according to the phase error estimated by the interpolation filter and outputs the received symbol as a first output symbol, a phase error compensation unit which compensates for the phase error which remains in the first output symbol and outputs the first output symbol as a second output symbol, a Quadrature Amplitude Modulation (QAM) symbol demapping unit which calculates a first bit string corresponding to the first output symbol and calculates a second bit string corresponding to the second output symbol, and an error correction decoder which performs error correction of a bit error in the first bit string and wherein the phase error compensation unit compensates for the phase error which remains in the first output symbol by referring to the first bit string after error correction.

2. The carrier wave reproduction device described in claim 1 wherein
the carrier wave reproduction device includes a buffer which temporarily holds the first output symbol outputted from the first phase rotator; and
the phase error compensation unit includes a second phase rotator which rotates the phase of the first output symbol outputted from the buffer and generates the second output symbol.

3. The carrier wave reproduction device described in claim 2 wherein the phase error compensation unit includes a Quadrature Amplitude Modulation (QAM) symbol mapping unit which generates a symbol corresponding to the bit string after error correction as a third output symbol.

4. The carrier wave reproduction device described in claim 3 wherein the phase error compensation unit detects a phase difference between at least either the first output symbol or the second output symbol and the third output symbol and compensates for the phase error which remains in the first output symbol.

5. The carrier wave reproduction device described in claim 4 wherein the phase error compensation unit includes
a phase error detector which detects the phase difference between the second output symbol and the third output symbol and
a numerical control oscillator which calculates a phase rotation amount based on the phase difference from which the high frequency component included in the phase difference is removed and the second phase rotator rotates the phase of the first output symbol outputted from the buffer according to the phase rotation amount and generates the second output symbol.

6. The carrier wave reproduction device according to claim 5 wherein the phase error compensation unit includes a loop filter which removes the high frequency component included in the phase difference and outputs it to the numerical control oscillator.

7. The carrier wave reproduction device described in claim 4 wherein the phase error compensation unit includes
a phase error detector which detects the phase difference between the first output symbol and the third output symbol and a low pass filter which performs the averaging of the phase difference and calculates the phase rotation amount and
the second phase rotator rotates the phase of the first output symbol outputted from the buffer according to the phase rotation amount and generates the second output symbol.

8. The carrier wave reproduction device according to claim 1, wherein the interpolation filter is a finite impulse response type filter including
a plurality of registers which hold the pilot symbol,
a plurality of multipliers whose number is equal to the number of plural registers, and
a plurality of adders whose number is equal to the number of plural registers.

9. The carrier wave reproduction device described in claim 8 wherein the interpolation filter determines an initial value of a tap coefficient and a step width used when the tap coefficient is updated according to a phase noise level and a carrier to noise ratio and updates the tap coefficient the number of times that is equal to the number of intervals between the pilot symbols included in the received symbol.

10. A demodulation device based on a quasi-synchronous detection method which includes the carrier wave reproduction device described in claim 1.

11. A carrier wave reproduction method including
a step of estimating a phase error of a received symbol based on a pilot symbol included in the received symbol,
a step of rotating the phase of the received symbol according to the estimated phase error and outputting the received symbol as a first output symbol,
a step of calculating a first bit string corresponding to the first output symbol,
a step of performing error correction of a bit error in the first bit string,
a step of compensating for the phase error which remains in the first output symbol by referring to the first bit string after error correction and outputting the first output symbol after phase error compensation as a second output symbol,
a step of calculating a second bit string corresponding to the second output symbol, and
a step of performing error correction of a bit error in the second bit string.

12. The carrier wave reproduction method described in claim 11 in which
a step for compensating for a phase error which remains in a n-th output symbol by referring to a n-th bit string after error correction (n is a natural number) and outputting the symbol as a (n+1)th output symbol,
a step for calculating a (n+1)th bit string corresponding to the (n+1)th output symbol, and
a step for performing error correction of a bit error in the (n+1)th bit string are repeated until n is equal to a predetermined number while incrementing n or all the errors are corrected in the error correction.

* * * * *

UNITED STATES PATENT AND TRADEMARK OFFICE
CERTIFICATE OF CORRECTION

PATENT NO.         : 9,136,979 B2                           Page 1 of 1
APPLICATION NO.    : 14/396089
DATED              : September 15, 2015
INVENTOR(S)        : Norifumi Kamiya and Eisaku Sasaki It is certified that error appears in the above-identified patent and that said Letters Patent is hereby corrected as shown below:

Specification

Column 18, Line 17: delete "δ" and insert -- θ --

Signed and Sealed this
Eighth Day of March, 2016

Michelle K. Lee
*Director of the United States Patent and Trademark Office*